US009287937B2

(12) United States Patent
Oba et al.

(10) Patent No.: US 9,287,937 B2
(45) Date of Patent: Mar. 15, 2016

(54) INFORMATION PROCESSING APPARATUS AND METHOD

(71) Applicant: Sony Corporation, Tokyo (JP)

(72) Inventors: Haruo Oba, Kanagawa (JP); Taku Sugawara, Tokyo (JP); Takeo Inagaki, Tokyo (JP); Junichi Rekimoto, Tokyo (JP); Nobuyuki Matsushita, Kanagawa (JP); Yuji Ayatsuka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/208,918

(22) Filed: Mar. 13, 2014

(65) Prior Publication Data

US 2014/0225716 A1    Aug. 14, 2014

Related U.S. Application Data

(63) Continuation of application No. 13/600,753, filed on Aug. 31, 2012, now Pat. No. 8,798,542, which is a continuation of application No. 10/416,557, filed as application No. PCT/JP02/09325 on Sep. 12, 2002, now Pat. No. 8,280,306.

(30) Foreign Application Priority Data

Sep. 13, 2001   (JP) ................................. 2001-278495

(51) Int. Cl.
*H04B 7/00* (2006.01)
*H04B 5/00* (2006.01)
(Continued)

(52) U.S. Cl.
CPC .......... *H04B 5/0056* (2013.01); *G06K 7/10297* (2013.01); *G06K 19/0723* (2013.01);
(Continued)

(58) Field of Classification Search
None
See application file for complete search history.

(56) References Cited

U.S. PATENT DOCUMENTS

| 5,008,661 A | 4/1991 | Raj |
| 5,668,875 A | 9/1997 | Brown et al. |

(Continued)

FOREIGN PATENT DOCUMENTS

| JP | 2001-144781 | 5/2001 |
| JP | 2001-156704 | 6/2001 |

(Continued)

OTHER PUBLICATIONS

Communication dated Apr. 5, 2007 from the European Patent Office for corresponding European patent application EP 02798828.6.

*Primary Examiner* — Zhiyu Lu
(74) *Attorney, Agent, or Firm* — Hauki International, LLC

(57) ABSTRACT

The present disclosure is directed to an information processing apparatus. The information processing apparatus may have a memory configured to store an identification information of an IC tag in association with a communication profile in a table. The information processing apparatus may also have a first communication unit configured to communicate with the IC tag using a first communication function. The information processing apparatus may also have a second communication unit configured to communicate with an external apparatus using a second communication function different from the first communication function. In addition, the information processing apparatus may have a controller, which may be configured to receive identification information from the IC tag through the first communication unit and to establish a connection with the external apparatus through the second communication unit based on the received identification information and the table stored in the memory.

11 Claims, 25 Drawing Sheets

(51) Int. Cl.
*H04L 29/06* (2006.01)
*H04M 1/725* (2006.01)
*G06K 7/10* (2006.01)
*G06K 19/07* (2006.01)
*G06K 19/077* (2006.01)
*H04W 12/04* (2009.01)
*H04W 40/00* (2009.01)
*H04W 56/00* (2009.01)
*H04W 84/18* (2009.01)
*H04W 88/06* (2009.01)

(52) U.S. Cl.
CPC ...... *G06K19/07749* (2013.01); *H04L 63/0492* (2013.01); *H04M 1/7253* (2013.01); *H04W 12/04* (2013.01); *H04M 2250/02* (2013.01); *H04W 40/00* (2013.01); *H04W 56/00* (2013.01); *H04W 84/18* (2013.01); *H04W 88/06* (2013.01)

(56) References Cited

U.S. PATENT DOCUMENTS

| | | | |
|---|---|---|---|
| 5,995,006 A | * | 11/1999 | Walsh ................... 340/572.7 |
| 6,624,752 B2 | | 9/2003 | Klitsgaard et al. |
| 6,697,638 B1 | | 2/2004 | Larsson et al. |
| 7,088,249 B2 | | 8/2006 | Senba et al. |
| 2001/0007815 A1 | | 7/2001 | Philipsson |
| 2002/0123325 A1 | | 9/2002 | Cooper |
| 2002/0147819 A1 | * | 10/2002 | Miyakoshi et al. ........... 709/228 |
| 2002/0154607 A1 | | 10/2002 | Forstadius et al. |
| 2002/0194303 A1 | | 12/2002 | Suila et al. |

FOREIGN PATENT DOCUMENTS

| | | |
|---|---|---|
| JP | 2002-271251 | 9/2002 |
| WO | WO 93/16531 | 8/1993 |
| WO | WO 98/16070 | 4/1998 |
| WO | WO 01/39103 | 5/2001 |

* cited by examiner

FIG. 13

| SPECIFICATION PARAMETERS | | | |
|---|---|---|---|
| COMMUNICATION RATE | | | 211.875kbps |
| POWER TRANSMISSION | | CENTER FREQUENCY | 13.56MHz |
| | | OUTPUT | 350mW |
| DATA TRANSFER | R/W → Card | CENTER FREQUENCY | 13.56MHz |
| | | MODULATION METHOD | ASK |
| | Card → R/W | CENTER FREQUENCY | 13.56MHz |
| | | MODULATION METHOD | LOAD SWITCHING |

|   | Strap ID | Bluetooth Device Name |
|---|----------|----------------------|
| 1 | A045PR63 | Red cellular phone |
| 2 | WW9565B | Yellow PDA |
| ⋮ | ⋮ | ⋮ |

|   | Strap ID | Bluetooth Address |
|---|----------|-------------------|
| 1 | A045PR63 | 08:00:46:21:14:F9 |
| 2 | WW9565BKO | 08:01:57:22:38:F9 |
|   | ⋮ | ⋮ |

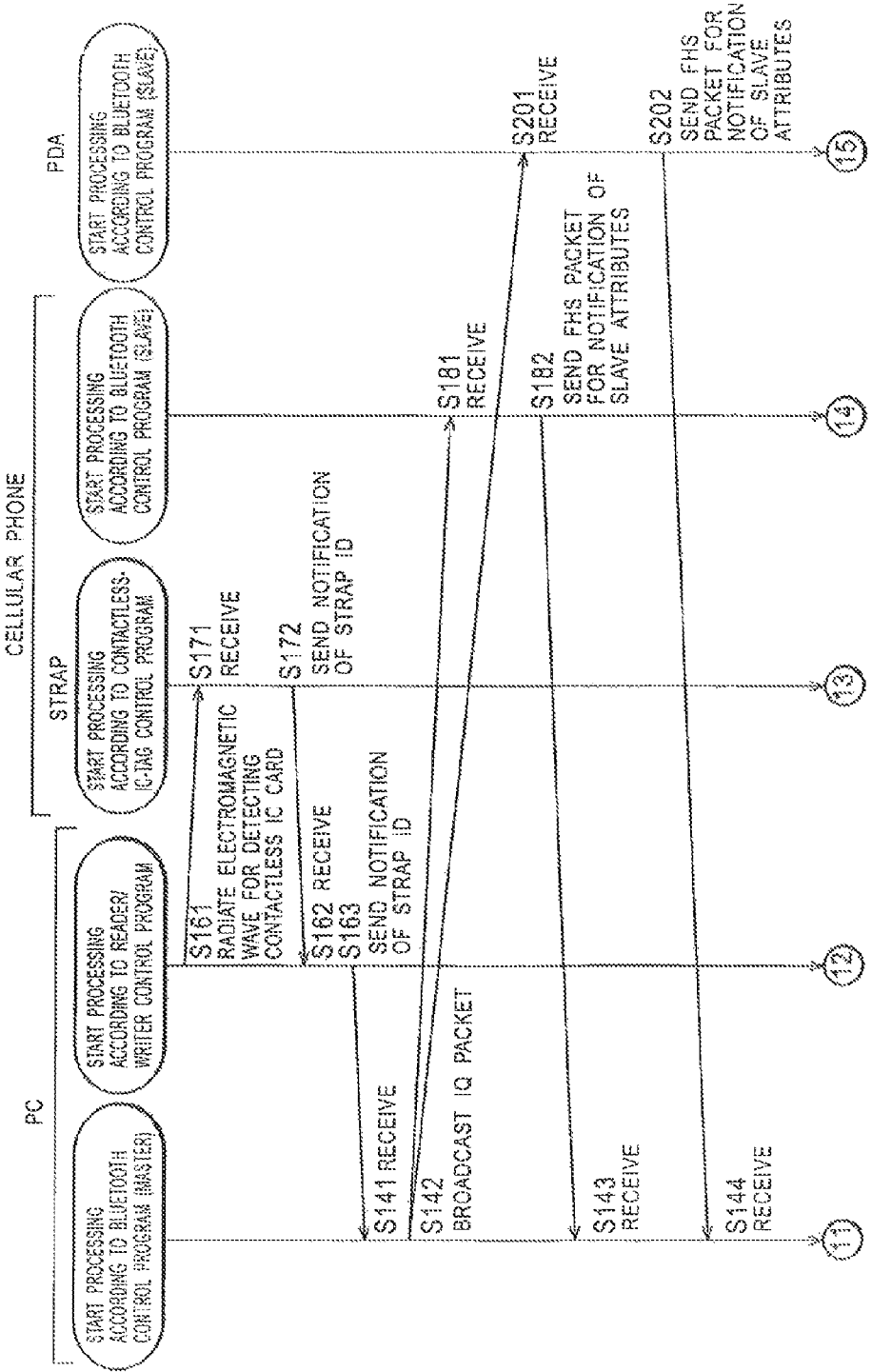

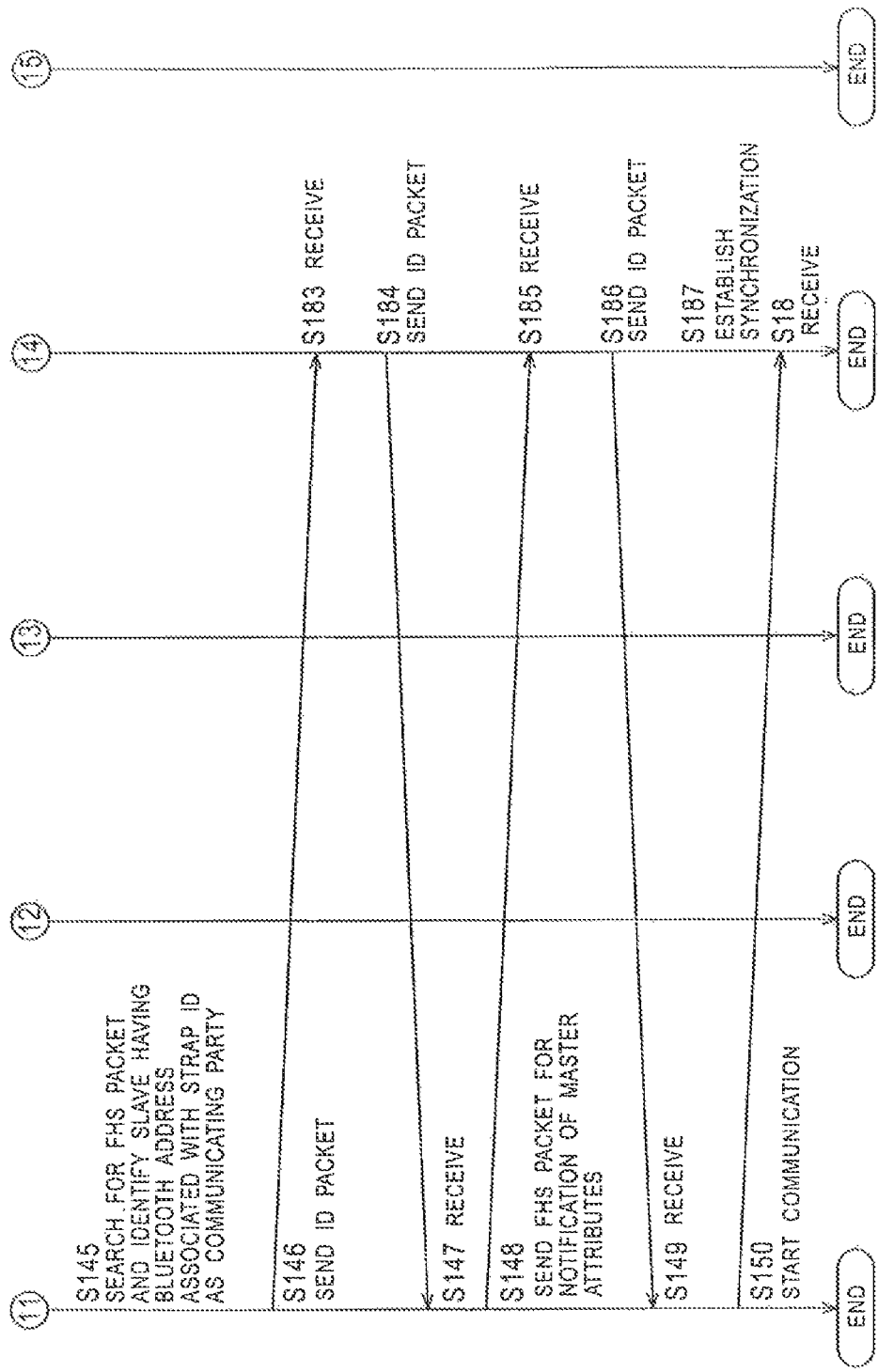

INFORMATION PROCESSING APPARATUS AND METHOD

CROSS REFERENCES TO RELATED APPLICATIONS

This is a continuation of application Ser. No. 13/600,753, filed Aug. 31, 2012, which is a continuation of application Ser. No. 10/416,557, filed Nov. 10, 2003 (now issued as U.S. Pat. No. 8,280,306, issued Oct. 2, 2012), and claims the benefit of Japanese Patent Application No. 2001-278495 filed Sep. 13, 2001. Both U.S. application Nos. 10/416,557 and 13/600,753 also claim the benefit of Japanese Patent Application No. 2001-278495, filed Sep. 13, 2001. Each of the above-referenced applications is incorporated herein by reference in its entirety.

TECHNICAL FIELD

The present invention particularly relates to an information processing apparatus and method that allow wireless communications to be carried out readily and quickly.

BACKGROUND ART

Recently, in accordance with development of communication technologies, etc., various communication methods based on particular standards have been proposed.

An example of such a communication method is Bluetooth™. Bluetooth is advantageous in that modules can be implemented in small size and in that power consumption is small, and thus application thereof to mobile terminals such as cellular phones and PDAs (personal digital assistants) has been proposed.

Expectations have also been raised for wireless LANs (IEEE (Institute of Electrical and Electronics Engineers) 802.11b), particularly due to a relatively fast transfer rate thereof.

Communications based on such communication methods, however, requires various selections or other operations to be performed, necessitating complex operations before starting communications.

For example, in the case of Bluetooth, when communication with a terminal is to be started, various terminals that exist nearby are detected, and a user is required to select a party for carrying out communication therewith from among the terminals.

DISCLOSURE OF INVENTION

The present invention has been made in view of the situation described above, and it allows wireless communications, for example, communications based on Bluetooth, to be carried out readily and quickly.

A first information processing apparatus according to the present invention comprises storage-processing means for storing identification information of a wireless communication device that operates based on induced electric power generated by receiving electromagnetic wave, and first terminal-name information of a first communication terminal, the identification information and the first terminal-name information being associated with each other; first obtaining-processing means for obtaining the identification information from the wireless communication device when it is placed in proximity, by a first wireless communication unit that allows communication by way of electromagnetic wave; synchronization-processing means for establishing synchronization for communication by a second wireless communication unit with a second communication terminal that exists in proximity; second obtaining-processing means for obtaining second terminal-name information of the second communication terminal when synchronization has been established therewith by the synchronization-processing means; and identification-processing means for identifying the communication terminal having the first terminal-name information associated with the identification information obtained by the first obtaining-processing means, from the second communication terminal having the second terminal-name information obtained by the second obtaining-processing means, based on the information stored by the storage-processing means.

The arrangement may further comprise acceptance-processing means for accepting input of the first terminal-name information, wherein the storage-processing means stores the identification information obtained by the first obtaining-processing means and the first terminal-name information accepted by the acceptance-processing means in association with each other.

The storage-processing means may further store information indicating a communication method of the first communication terminal in association with the identification information.

A first information processing method for an information processing apparatus according to the present invention comprises a storage-processing step of storing identification information of a wireless communication device that operates based on induced electric power generated by receiving electromagnetic wave, and first terminal-name information of a first communication terminal, the identification information and the first terminal-name information being associated with each other; a first obtaining-processing step of obtaining the identification information from the wireless communication device when it is placed in proximity, by a first wireless communication unit that allows communication by way of electromagnetic wave; a synchronization-processing step of establishing synchronization for communication by a second wireless communication unit with a second communication terminal that exists in proximity; a second obtaining-processing step of obtaining second terminal-name information of the second communication terminal when synchronization has been established therewith in the synchronization-processing step; and an identification-processing step of identifying the communication terminal having the first terminal-name information associated with the identification information obtained in the first obtaining-processing step, from the second communication terminal having the second terminal-name information obtained in the second obtaining-processing step, based on the information stored in the storage-processing step.

A first program according to the present invention allows a computer to execute a storage-processing step of storing identification information of a wireless communication device that operates based on induced electric power generated by receiving electromagnetic wave, and first terminal-name information of a first communication terminal, the identification information and the first terminal-name information being associated with each other; a first obtaining-processing step of obtaining the identification information from the wireless communication device when it is placed in proximity, by a first wireless communication unit that allows communication by way of electromagnetic wave; a synchronization-processing step of establishing synchronization for communication by a second wireless communication unit with a second communication terminal that exists in proximity; a second obtaining-processing step of obtaining second terminal-name information of the second communication terminal when synchronization has been established therewith in the synchronization-processing step; and an identification-processing step of identifying the communication terminal having the first terminal-name information associated with the identification information obtained in the first obtaining-processing step, from the second communication terminal having the second terminal-name information obtained in the second obtaining-processing step, based on the information stored in the storage-processing step.

A second information processing apparatus according to the present invention comprises storage-processing means for storing first identification information for identifying a wireless communication device that operates based on induced electric power generated by receiving electromagnetic wave, and second identification information for identifying a first communication terminal, the first identification information and the second identification information being associated with each other; first obtaining-processing means for obtaining the first identification information from the wireless communication device when it is placed in proximity, by a first wireless communication unit that allows communication by way of electromagnetic wave; second obtaining-processing means for obtaining, from a second communication terminal that exists in proximity, third identification information for identifying the second communication terminal, by a second wireless communication unit; identification-processing means for identifying the first communication terminal having the second identification information associated with the first identification information obtained by the first obtaining-processing means, from the second communication terminal having the third identification information obtained by the second obtaining-processing means, based on the information stored by the storage-processing means; and synchronization-processing means for establishing synchronization for communication by the second wireless communication unit with the first communication terminal identified by the identification-processing means.

The arrangement may further comprise acceptance-processing means for accepting input of the second identification information, wherein the storage-processing means stores the first identification information obtained by the first obtaining-processing means and the second identification information accepted by the acceptance-processing means in association with each other.

The storage-processing means may further store information indicating a communication method of the first communication terminal in association with the first identification information.

A second information processing method for an information processing apparatus according to the present invention comprises a storage-processing step of storing first identification information for identifying a wireless communication device that operates based on induced electric power generated by receiving electromagnetic wave, and second identification information for identifying a first communication terminal, the first identification information and the second identification information being associated with each other; a first obtaining-processing step of obtaining the first identification information from the wireless communication device when it is placed in proximity, by a first wireless communication unit that allows communication by way of electromagnetic wave; a second obtaining-processing step of obtaining, from a second communication terminal that exists in proximity, third identification information for identifying the second communication terminal, by a second wireless communication unit; an identification-processing step of identifying the first communication terminal having the second identification information associated with the first identification information obtained in the first obtaining-processing step, from the second communication terminal having the third identification information obtained in the second obtaining-processing step, based on the information stored in the storage-processing step; and a synchronization-processing step of establishing synchronization for communication by the second wireless communication unit with the first communication terminal identified in the identification-processing step.

A second program according to the present invention allows a computer to execute a storage-processing step of storing first identification information for identifying a wireless communication device that operates based on induced electric power generated by receiving electromagnetic wave, and second identification information for identifying a first communication terminal, the first identification information and the second identification information being associated with each other; a first obtaining-processing step of obtaining the first identification information from the wireless communication device when it is placed in proximity, by a first wireless communication unit that allows communication by way of electromagnetic wave; a second obtaining-processing, step of obtaining, from a second communication terminal that exists in proximity, third identification information for identifying the second communication terminal, by a second wireless communication unit; an identification-processing step of identifying the first communication terminal having the second identification information associated with the first identification information obtained in the first obtaining-processing step, from the second communication terminal having the third identification information obtained in the second obtaining-processing step, based on the information stored in the storage-processing step; and a synchronization-processing step of establishing synchronization for communication by the second wireless communication unit with the first communication terminal identified in the identification-processing step.

According to the first information processing apparatus and method, and program, identification information of a wireless communication device that operates based on induced electric power generated by receiving electromagnetic wave, and first terminal-name information of a first communication terminal are stored in association with each other, and the identification information is obtained from the wireless communication device when it is placed in proximity, by a first wireless communication unit that allows communication by way of electromagnetic wave. Furthermore, synchronization for communication by a second wireless communication unit is established with a second communication terminal that exists in proximity, and second terminal-name information of the second communication terminal is obtained when synchronization has been established therewith. Furthermore, the communication terminal having the first terminal-name information associated with the identification information obtained is identified, from the second communication terminal having the second terminal-name information, based on the information stored.

According to the second information processing apparatus and method, and program, first identification information for identifying a wireless communication device that operates based on induced electric power generated by receiving electromagnetic wave, and second identification information for identifying a first communication terminal are stored in association with each other, and the first identification information is obtained from the wireless communication device when it is placed in proximity, by a first wireless communication unit that allows communication by way of electromagnetic wave. Furthermore, from a second communication terminal that exists in proximity, third identification information for identifying the second communication terminal is obtained by a second wireless communication unit. Furthermore, the first communication terminal having the second identification information associated with the first identification information obtained is identified, from the second communication terminal having the third identification information, based on the information stored. Furthermore, synchronization for communication by the second wireless communication unit is established with the first communication terminal identified.

BRIEF DESCRIPTION OF THE DRAWINGS

FIG. 13 is a diagram showing an example of specifications of communications carried out between the contactless IC tag and the reader/writer.

FIG. 28 is a flowchart showing another process that is executed by the communication system shown in FIG. 2.

FIG. 29 is a flowchart subsequent to FIG. 28, showing another process that is executed by the communication system shown in FIG. 2.

BEST MODE FOR CARRYING OUT THE INVENTION

Figure 1:
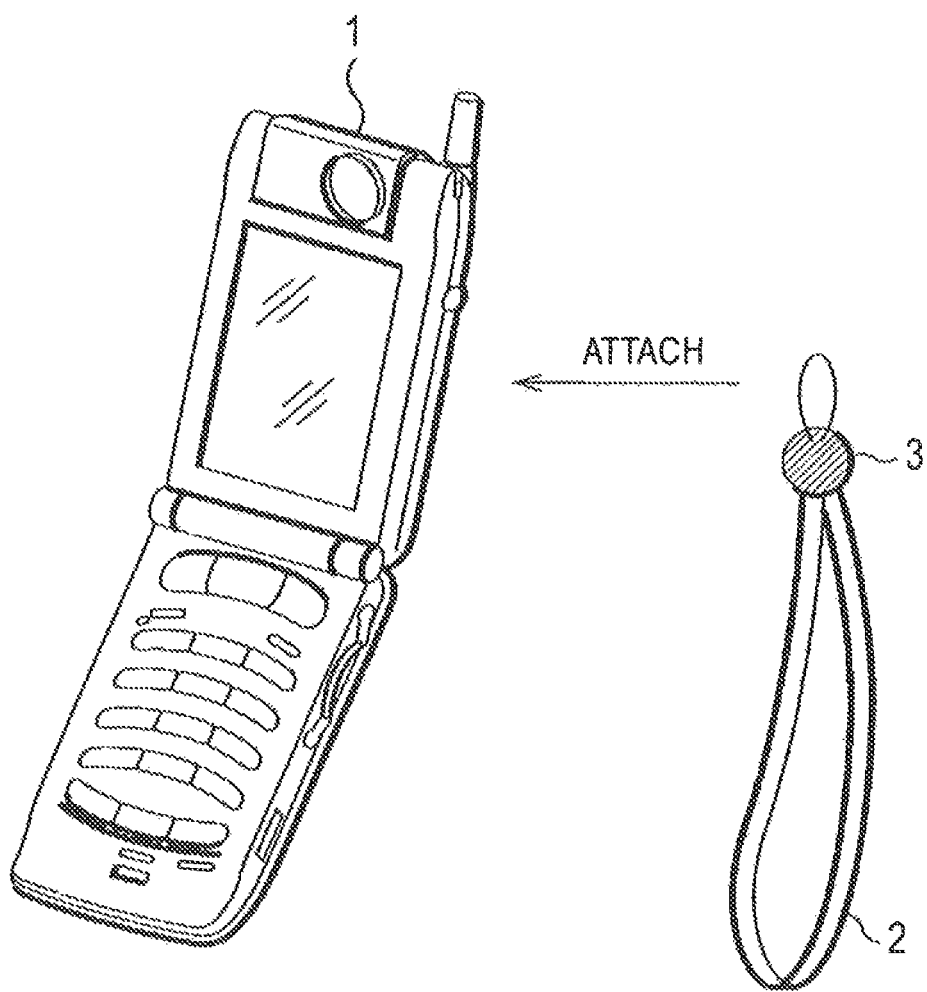
FIG. 1 is an illustration showing an example of cellular phone that is used in a communication system according to the present invention.

FIG. 1 is an illustration showing a cellular phone 1 that is used in a communication system according to the present invention.

As will be described later, the cellular phone 1 shown in FIG. 1 includes a Bluetooth module, and is thus capable of carrying out communications based on Bluetooth with other Bluetooth devices.

A cellular phone strap 2 (hereinafter simply referred to as a strap 2) that is attached to the cellular phone 1, like straps in general, serves to prevent losing the cellular phone 1 when it is attached to the cellular phone 1. Furthermore, on the strap 2, a contactless IC tag 3 is provided at a predetermined position on a side of attachment to the cellular phone 1, for example, as shown in FIG. 1.

Thus, a user is allowed to provide various data stored in the contactless IC tag 3 to a predetermined reader/writer by placing the cellular phone 2 with the strap 2 attached thereto in proximity to the reader/writer.

Figure 2:
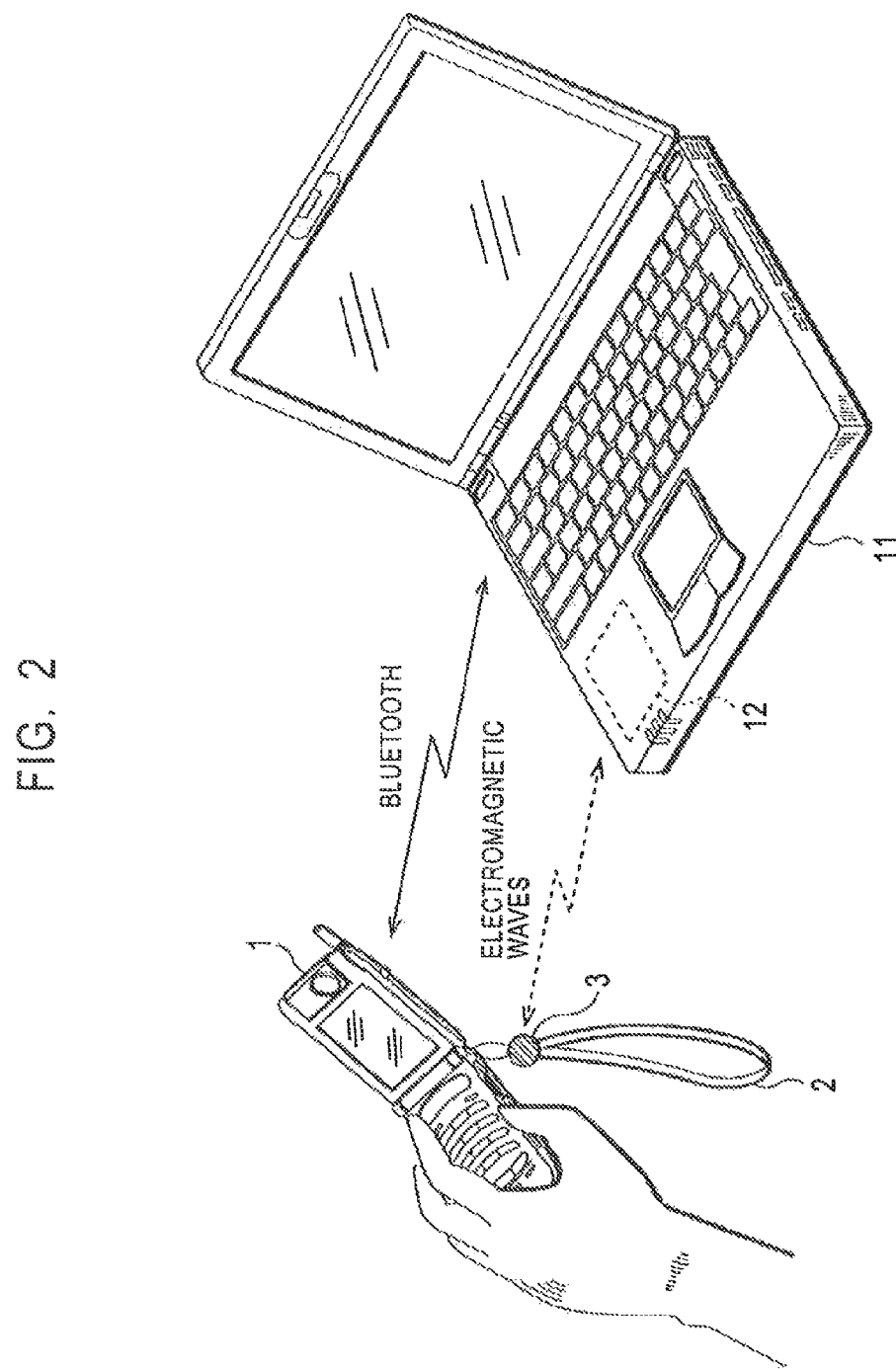
FIG. 2 is a diagram showing an example configuration of the communication system according to the present invention.

FIG. 2 is a diagram showing an example configuration of a communication system according to the present invention.

A personal computer 11 shown in the figure includes a Bluetooth module, similarly to the cellular phone 1, and is thus capable of exchanging various information with, for example, the cellular phone 1 by wireless communications based on Bluetooth.

Furthermore, the personal computer 11 includes a reader/writer 12 that allows various information to be written to and read from the contactless IC tag 3 when the contactless IC tag 3 is placed in proximity. Thus, between the personal computer 11 and the cellular phone 1 with the strap 2 attached thereto, in addition to communications based on Bluetooth, indicated by a solid arrow, communications are also allowed by way of electromagnetic waves radiated from the reader/writer 12, indicated by a dotted arrow.

In this communication system, for example, if the personal computer 11 is the master of a piconet defined by Bluetooth, the personal computer 11, based on information obtained from the contactless IC tag 3 by way of electromagnetic waves, is allowed to identify the cellular phone 1 as a slave that carries out communications based on Bluetooth.

The processing, which will be described later in detail with reference to flowcharts, is such that when the user places the cellular phone 1 with the strap 2 attached thereto in proximity to the personal computer 11 and an electromagnetic wave radiated from the reader/writer 12 is received by the contactless IC tag 3, identification information preset in the contactless IC tag 3 (hereinafter referred to as a strap ID) is provided therefrom to the personal computer 11.

Strap IDs are registered in the personal computer 11 in association with, for example, Bluetooth device names that are set respectively for Bluetooth devices. Upon receiving a notification of a strap ID from the contactless IC tag 3, the personal computer 11 refers to a table defining the association to identify a terminal having a Bluetooth device name registered in association with the strap ID transmitted, i.e., the cellular phone 1, as a terminal of a communicating party. As will be described later, when synchronization for carrying out communications based on Bluetooth (synchronization within a piconet) is established, the master obtains Bluetooth device names of slaves that exist nearby.

Thus, even if a plurality of Bluetooth devices exists in proximity, the personal computer 1 is allowed to identify the cellular phone 1 from among the plurality of devices and to communicate therewith.

Thus, the user is allowed to communicate with the personal computer 11 based on Bluetooth only by placing the cellular phone 1 in proximity to the personal computer 11. Furthermore, the user is also allowed to initiate communication between the cellular phone 1 and the personal computer 11 by placing only the strap 2 in proximity to the personal computer 11.

If the strap 2 is not attached to the cellular phone 1 (if a strap ID associated with a Bluetooth device name of the cellular phone 1 is not transmitted from the contactless IC tag 3), in order to initiate communication between the cellular phone 1 and the personal computer 11 based on Bluetooth, the user is required to select the cellular phone 1 from among a plurality of nearby Bluetooth devices detected by the personal computer 11. This operation is omitted.

Next, the components of the communication system shown in FIG. 2 will be described.

Figure 3:
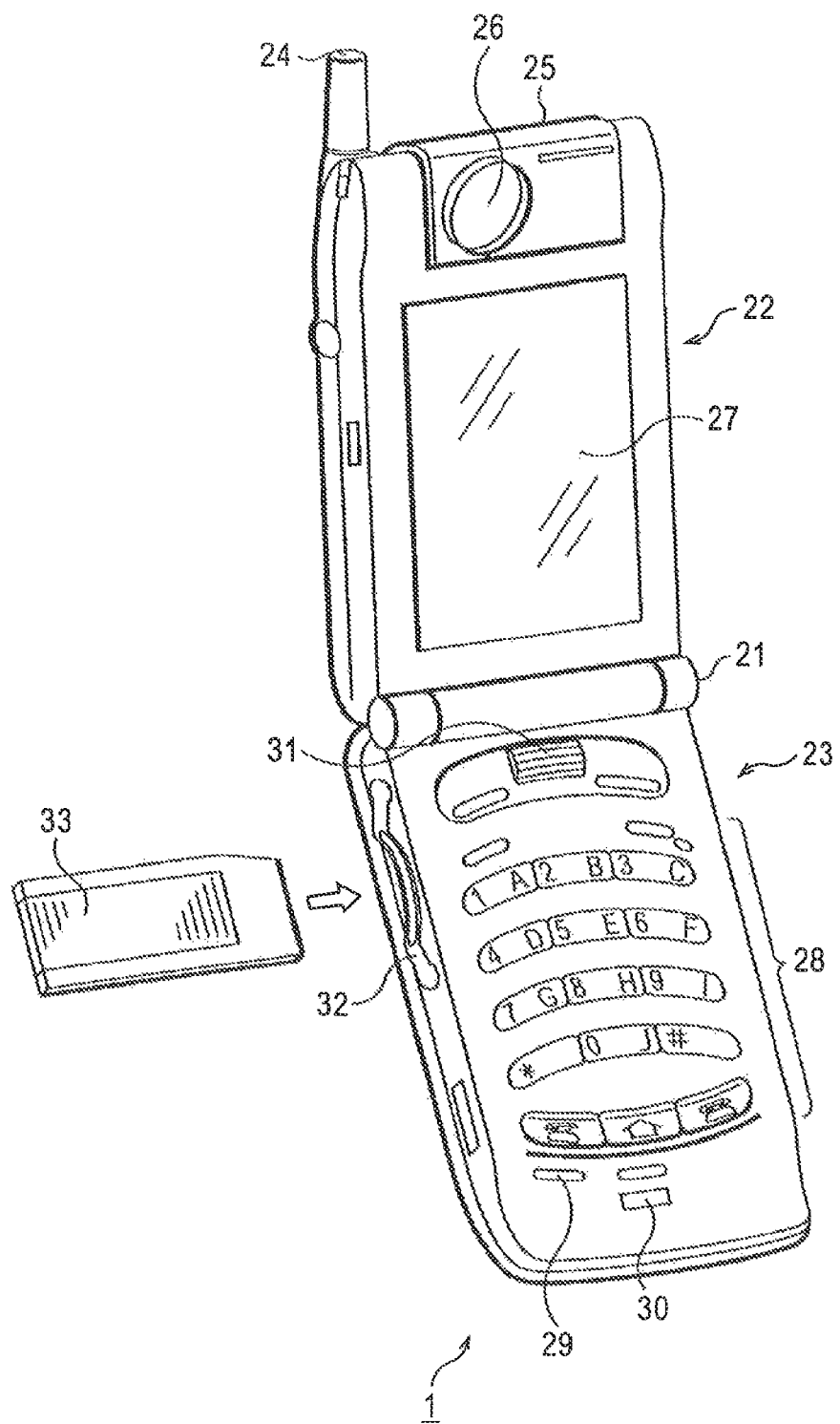
FIG. 3 is an illustration showing an example of the external view of the cellular phone shown in FIG. 2.

FIG. 3 shows an example of the external view of the cellular phone 1 shown in FIG. 2.

Referring to FIG. 3, the cellular phone 1 includes a display 22 and a main unit 23, and can be folded at a hinge 21 at a center.

The display 22, on a top left part thereof, has a transmitting/receiving antenna 24 that can be extended and retracted. The cellular phone 1 exchanges radio waves with base stations, which are fixed wireless terminals, via the antenna 24.

Furthermore, the display 22 has a camera unit 25 that is rotatable substantially over an angular range of 180°. The cellular phone 1 captures an image of a desired target by a CCD (charge coupled device) camera 26 of the camera unit 25.

Figure 4:
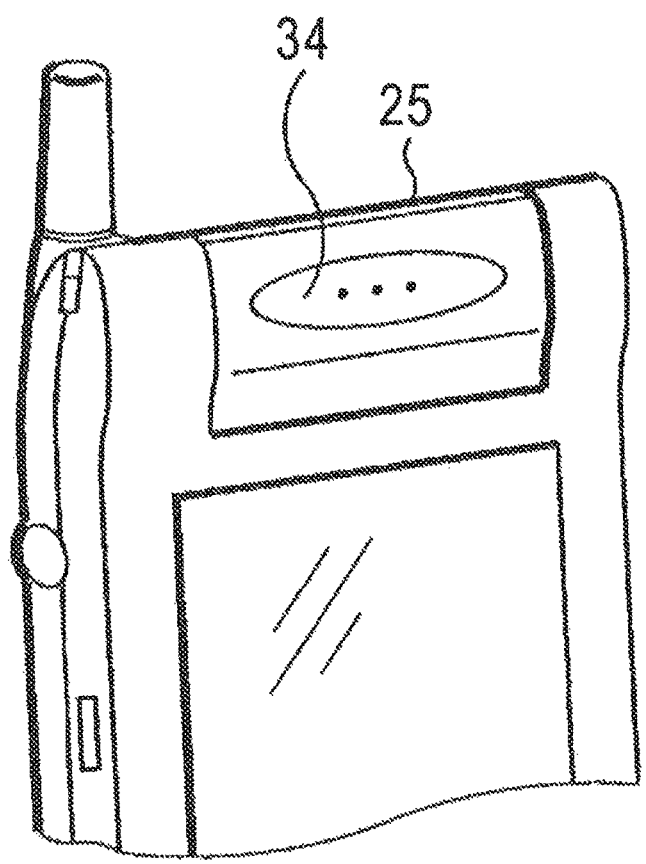
FIG. 4 is an illustration showing another example of the external view of the cellular phone shown in FIG. 2.

When the user rotates the camera unit 25 substantially by 180° and fixes it at that position, the display 22 is in such a state that a speaker 34 provided at a center of a back side of the camera unit 25 is located at a front side, as shown in FIG. 4. Thus, the cellular phone 1 is switched to a normal phone-call state.

Furthermore, a liquid crystal display 27 is provided at a center of the display 22. The liquid crystal display 27 displays reception status of radio waves, remaining battery charge, names of parties and their phone numbers registered in the form of a telephone directory, calling history, and in addition, content of e-mails, simple Web pages, images captured by the CCD camera 26 of the camera unit 25, etc.

The main unit 23 has operation keys 28 on its surface, including numeric keys of "0" to "9", a calling key, a redialing key, a call-termination/power key, a clear key, and an e-mail key. Various commands in accordance with operations of the operation keys 28 are input to the cellular phone 1.

Furthermore, on the main unit 23, a memo button 29 and a microphone 30 are provided below the operation keys 28.

When the memo button 29 is operated, the cellular phone 1 records voice of a communicating party during a call. The cellular phone 1 collects voice of the user during the call by the microphone 30.

Furthermore, on the main unit 23, a rotatable jog dial 31 is provided above the operation keys 28, slightly projecting from the surface of the main unit 23. The cellular phone 1 executes various processes in accordance with rotating operations of the jog dial 31; for example, it scrolls a telephone directory list or an e-mail, turns simple Web pages, or plays images sequentially on the liquid crystal display 27.

For example, the cellular phone 1 selects a desired phone number from a plurality of phone numbers in a telephone directory list displayed on the liquid crystal display 27, in accordance with a rotating operation of the jog dial 31 by the user. When the jog dial 31 is pressed inward of the main unit 23, the cellular phone 1 fixes the selected phone number and calls the phone number.

The cellular phone 1 has a battery pack, not shown, mounted on a back side thereof. When the call-termination/power key is turned on, each circuit receives power from the battery pack and is activated to allow operation.

In an upper part of a left side surface of the main unit 23, a memory-stick slot 32 for mounting a detachable memory stick (registered trademark) 33 is provided. When the memo button 29 is pressed, the cellular phone 1 records voice of a communicating party on the memory stick 33 mounted thereon. The cellular phone 1, in accordance with user operations, records e-mails, simple Web pages, and images captured by the CCD camera 26 on the memory stick 33 mounted thereon.

The memory stick 33 is a type of flash memory card developed by Sony Corporation, which is the applicant of this application. The memory stick 33 contains a flash memory, which is a type of EEPROM (electrically erasable and programmable read only memory), i.e., a non-volatile memory that allows rewriting and erasing electrically, in a plastic case that is 21.5 mm long, 50 mm wide, and 2.8 mm thick. The memory stick 33 allows writing and reading of various data, such as image, sound, and music, via ten pins.

The cellular phone 1, on which the memory stick 33 can be mounted, is allowed to share data with other electronic apparatuses via the memory stick 33.

Furthermore, the functions of the cellular phone 1 can be further extended by incorporating modules (chips) for adding particular functions in the memory stick 33 and mounting the memory stick 33 on the memory-stick slot 32.

For example, by mounting the memory stick 33 incorporating a Bluetooth module and a contactless IC tag on the cellular phone 1, the functions of the cellular phone 1 can be extended so as to allow communications with the personal computer 11 based on Bluetooth and communications via the contactless IC tag.

Figure 5:
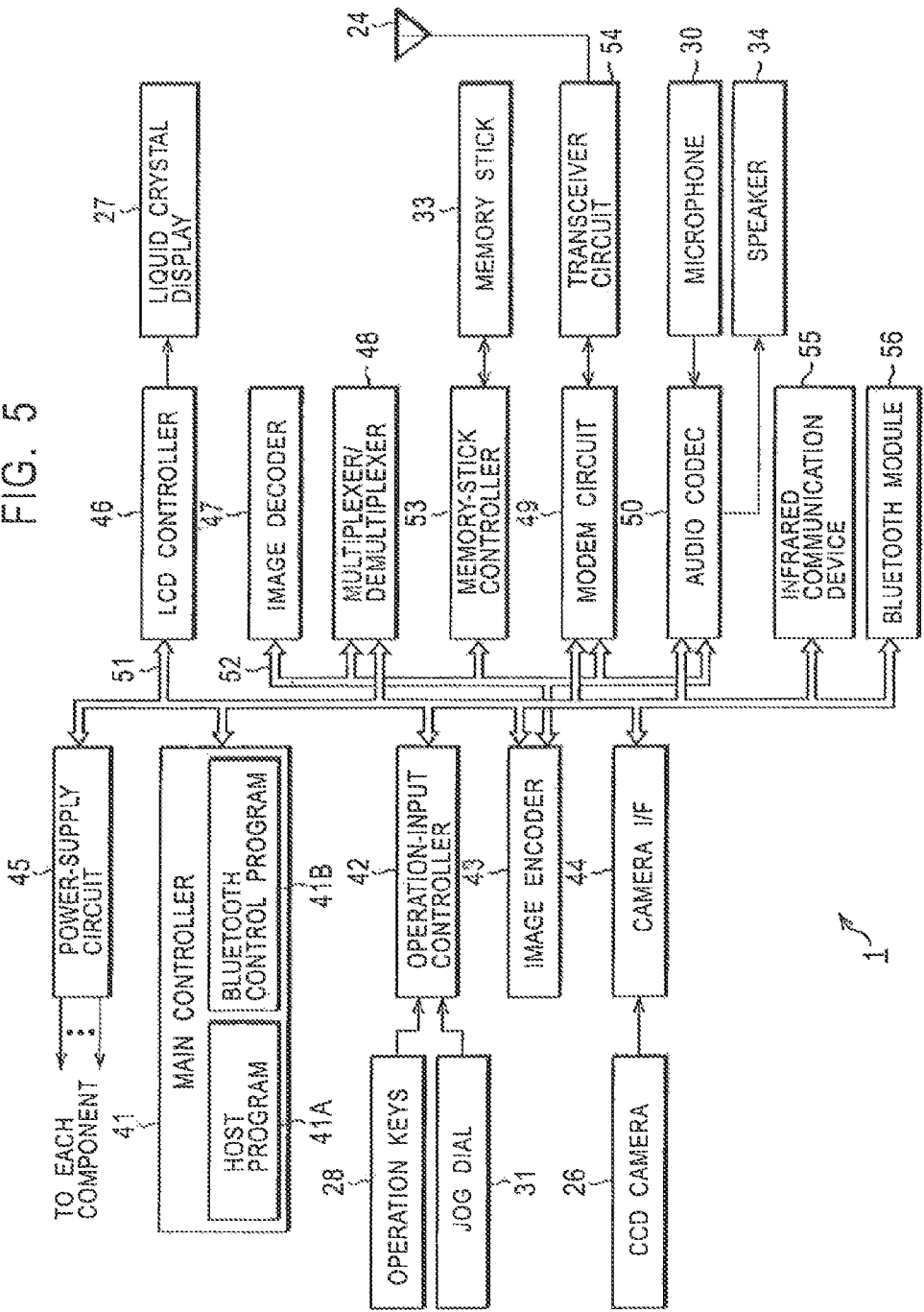
FIG. 5 is a block diagram showing an example functional configuration of the cellular phone shown in FIG. 2.

FIG. 5 is a diagram showing an example of the internal configuration of the cellular phone 1.

A main controller 41 for integrally controlling the components of the display 22 and the main unit 23 is connected via a main bus 51 to a power-supply circuit 45, an operation-input controller 42, an image encoder 43, a camera interface (I/F) 44, an LCD (liquid crystal display) controller 46, a multiplexer/demultiplexer 48, a modem circuit 49, an audio codec 50, an infrared communication device 55, and a Bluetooth module 56. Furthermore, the image encoder 43, an image decoder 47, the multiplexer/demultiplexer 48, a memory-stick controller 53, the modem circuit 49, and the audio codec 50 are connected to each other via a synchronization bus 52.

When the call-termination/power key is turned on by a user operation, each of the components receives power from the battery pack, whereby the cellular phone 1 is activated to allow operation.

The overall operation of the cellular phone 1 is controlled by the main controller 41 including a CPU (central processing unit), a ROM (read only memory), and a RAM (random access memory). As shown in the figure, the main controller 41 is provided with, in the ROM thereof, a host program 41A for controlling the overall operation of the cellular phone 1, and a Bluetooth control program 41B for controlling the Bluetooth module 56.

The cellular phone 1, under the control of the main controller 41, in a phone-call mode, converts an audio signal collected by the microphone 30 into digital audio data by the audio codec 50. The cellular phone 1 performs spectrum spreading on the digital audio data in the modem circuit 49, performs digital-to-analog conversion and frequency conversion in a transceiver circuit 54, and sends the resulting signal via the antenna 24.

Also, in the phone-call mode, the cellular phone 1 amplifies a signal received by the antenna 24, performs frequency conversion and analog-to-digital conversion, performs spectrum despreading in the modem circuit 49, and converts the result into an analog audio signal by the audio codec 50. The cellular phone 1 outputs a sound corresponding to the analog audio signal by the speaker 34.

Furthermore, the cellular phone 1, when sending an e-mail in a data-communication mode, sends text data input by operations of the operation keys 28 and the jog dial 31 to the main controller 41 via the operation-input controller 42.

The main controller 41 performs spectrum spreading on the text data in the modem circuit 49, performs digital-to-analog conversion and frequency conversion in the transceiver circuit 54, and sends the result to a base station via the antenna 24.

On the other hand, when receiving an e-mail in the data-communication mode, the cellular phone 1 performs spectrum despreading on a signal received from a base station via the antenna 24 in the modem circuit 49 to restore original text data, and displays the text data as an e-mail on the liquid crystal display 27 via the LCD controller 46.

Then, the cellular phone 1 is allowed to record the e-mail received in accordance with a user operation in the memory stick 33 via the memory-stick controller 53.

When sending image data in the data-communication mode, the cellular phone 1 transfers image data captured by the CCD camera 26 to the image encoder 43 via the camera interface 44.

When not sending image data, the cellular phone 1 is allowed to directly display image data captured by the CCD camera 26 on the liquid crystal display 27 via the camera interface 44 and the LCD controller 46.

The image encoder 43 compresses and encodes image data transferred from the CCD camera 26 into encoded image data by a predetermined coding method, for example, MPEG (Moving Picture Experts Group) 2 or MPEG 4, and sends the encoded image data to the multiplexer/demultiplexer 48.

At the same time, the cellular phone 1 sends sound collected by the microphone 30 while the image is captured by the CCD camera 26 to the multiplexer/demultiplexer 48 via the audio codec 50 as digital audio data.

The multiplexer/demultiplexer 48 multiplexes the encoded image data transferred from the image encoder 43 and the audio data transferred from the audio codec 50 by a predetermined method, performs spectrum spreading on the resulting multiplexed data in the modem circuit 49, performs digital-to-analog conversion and frequency conversion in the transceiver circuit 54, and then sends the result via the antenna 24.

On the other hand, for example, when receiving data of a moving-picture file that is linked to a simple Web page or the like in the data-communication mode, the cellular phone 1 performs spectrum despreading on a signal received from a base station via the antenna 24 in the modem circuit 49, and forwards the resulting multiplexed data to the multiplexer/demultiplexer 48.

The multiplexer/demultiplexer 48 demultiplexes the multiplexed data into encoded image data and audio data, and forwards the encoded image data to the image decoder 47 and the audio data to the audio codec 50 via the synchronization bus 52.

The image decoder 47 decodes the encoded image data by a decoding method in accordance with a predetermined encoding method, for example, MPEG2 or MPEG4, to generate moving-picture data for playback, and forwards the data to the liquid crystal display 27 via the LCD controller 46. Thus, the cellular phone 1 displays moving-picture data included in a file that is linked, for example, to a simple Web page.

At the same time, the audio codec 50 converts the audio data into an analog audio signal, and forwards the audio signal to the speaker 34. Thus, the cellular phone 1 plays back audio data included in a moving-picture file that is linked, for example, to a simple Web page.

Also in this case, similarly to the case of an e-mail, the cellular phone 1 is allowed to record data received, linked to a simple Web page or the like, in the memory stick 33 via the memory-stick controller 53 by a user operation.

The Bluetooth module 56 is constructed similarly to a Bluetooth module 145 (refer to FIG. 11) included in the personal computer 11, and communicates with other Bluetooth devices, including the personal computer 11, based on Bluetooth.

Now, communications based on Bluetooth will be described.

Types of network configuration based on Bluetooth include piconet, and scatternet in which a plurality of piconets is connected with each other. In each piconet, Bluetooth devices acting as so-called master and slave exist.

In order to establish synchronization within a piconet and exchange various information, synchronization with respect to the frequency axis and synchronization with respect to the time axis must be established between a master and slaves constituting the piconet.

According to Bluetooth, a signal is sent, for example, from a master to a slave, using a frequency band with a width of 79 MHz. At that time, the master does not occupy the frequency band over 79 MHz simultaneously to send information, but randomly changes (hops) the frequency for transmitting information by a step size of 1 MHz.

The slave at the receiving end synchronizes with the randomly changing transmitting frequency of the master, and changes the receiving frequency as required, thereby receiving the information transmitted from the master.

The pattern of frequency changed by the master and the slave is referred to as a frequency-hopping pattern, and synchronization with respect to the frequency axis is assumed if the master and the slave share a frequency-hopping pattern.

Furthermore, in Bluetooth, in order to allow communications between a master and a plurality of slaves, communication paths (channel) between the master and the respective slaves are time-division-multiplexed by the unit of 625 µs. Each time period by the unit of 625 µs is referred to as a time slot. Synchronization with respect to the time axis is assumed if the master and the slaves share time slots.

Each of the slaves calculates a frequency-hopping pattern based on the Bluetooth address of the master, and adds an offset based on the Bluetooth clock of the master to the Bluetooth clock that is managed on its own, thereby achieving timing synchronization of time slots.

The Bluetooth address of each Bluetooth device is unique and represented in 48 bits. The Bluetooth clock of each Bluetooth device is managed on its own.

Thus, before forming a piconet, various information including a Bluetooth address and a Bluetooth clock is exchanged between the master and slaves by processes referred to as "inquiry" and "paging", which will be described later.

Furthermore, each Bluetooth device has a Bluetooth device name assigned thereto. The Bluetooth device name can be arbitrarily set by the user.

Figure 6:
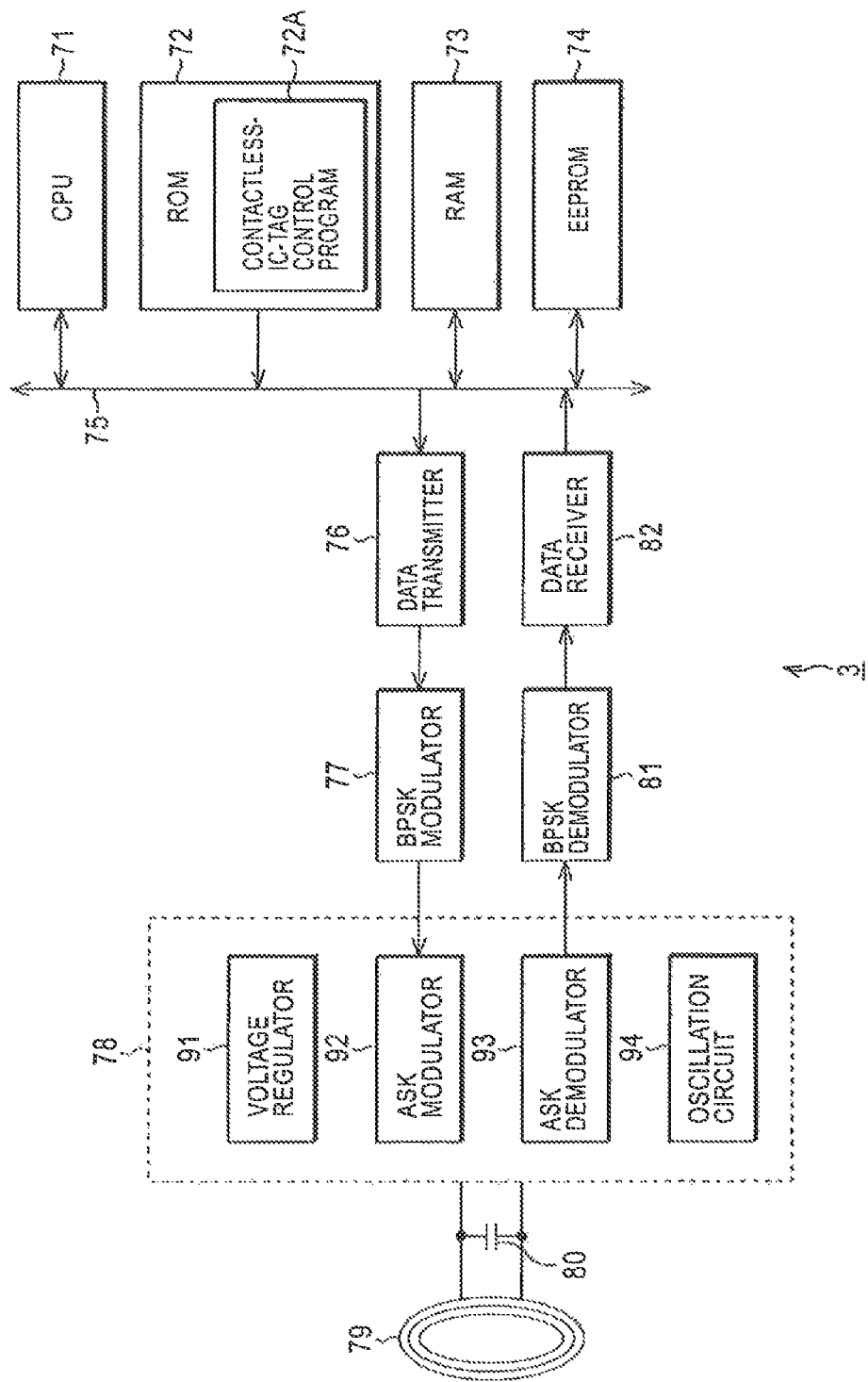
FIG. 6 is a block diagram showing an example configuration of a contactless IC tag shown in FIG. 2.

FIG. 6 is a block diagram showing in detail an example configuration of the contactless IC tag 3 provided on the strap 2.

The contactless IC tag 3 is implemented, for example, in the form of a single-chip IC including an antenna (loop antenna) 79 and a capacitor 80, shown in the figure, and other components. The contactless IC tag 3 exchanges various data with the reader/writer 12 in half duplex by electromagnetic induction.

The contactless IC tag 3 is so referred to for convenience of description, and is intended to refer to a module having the functions described above and to be described later. For example, Felica (registered trademark) has substantially the same functions as the contactless IC tag 3.

A CPU 71 loads a contactless-IC-tag control program 72A stored in a ROM 72 into a RAM 73, and controls the overall operation of the contactless IC tag 3. For example, when an electromagnetic wave radiated from the reader/writer 12 is received by the antenna 79, in response thereto, the CPU 71 sends notification of a preset strap ID to the reader/writer 12.

An interface unit 78, in an ASK (amplitude shift keying) demodulator 93 thereof, detects an envelop of a modulated wave (ASK-modulated wave) received by the antenna 79, outputting demodulated data to a BPSK (binary phase shift keying) demodulator 81. An LC circuit formed of the antenna 79 and the capacitor 80 is caused to resonate by an electromagnetic wave having a predetermined frequency, radiated from the reader/writer 12.

Furthermore, the interface unit 78, in the ASK demodulator 93 thereof, rectifies an AC magnetic field excited by the antenna 79, stabilizes the result by a voltage regulator 91, and forwards the result to each of the components as a DC power. The power of the electromagnetic wave radiated from the reader/writer 12 is adjusted so as to generate a magnetic field that provides power required for the contactless IC tag, as will be described later.

Furthermore, the interface unit 78, in an oscillation circuit 94 thereof, oscillates a signal having the same frequency as the clock frequency of data, outputting the oscillation signal to a PLL unit that is not shown.

Furthermore, for example, when sending data such as a strap ID to the reader/writer 12, the interface unit 78, for example, turns a predetermined switching element on or off in accordance with data transferred from a BPSK modulator 77 so that a predetermined load will be connected in parallel to the antenna 79 only when the switching element is turned on, thereby changing the load of the antenna 79.

An ASK modulator 92, in accordance with change in the load of the antenna 79, ASK-modulates a modulated wave from the reader/writer 12, received by the antenna 79, and sends the modulated component to the reader/writer 12 via the antenna 79 (changes a terminal voltage of an antenna 175 (refer to FIG. 12) of the reader/writer 12) (load-switching method).

The BPSK demodulator 81, if the data demodulated by the ASK demodulator 93 is BPSK-modulated, demodulates the data (decodes Manchester codes) based on a clock signal fed from the PLL unit not shown, outputting demodulated data to a data receiver 82. The data receiver 82 outputs the data to the CPU 71, etc. as required.

The BPSK modulator 77 performs BPSK-modulation (coding into Manchester codes) on the data transferred from a data transmitter 76, outputting the result to the ASK modulator 92.

The contactless IC tag 3, in addition to sending a notification of the strap ID to the personal computer 11, executes various processes including authentication with the reader/writer 12 and encryption of data to be transmitted.

Figure 7:
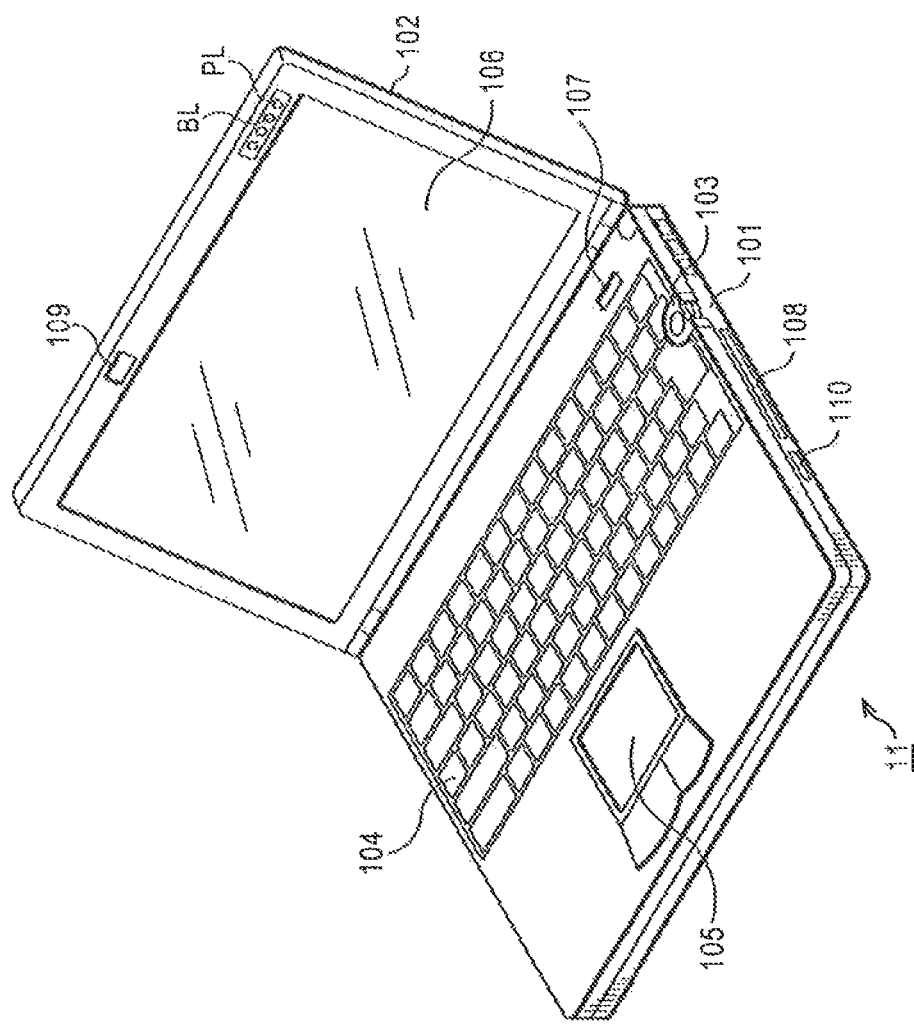
FIG. 7 is an illustration showing an example of the external view of a personal computer shown in FIG. 2.
Figure 8:
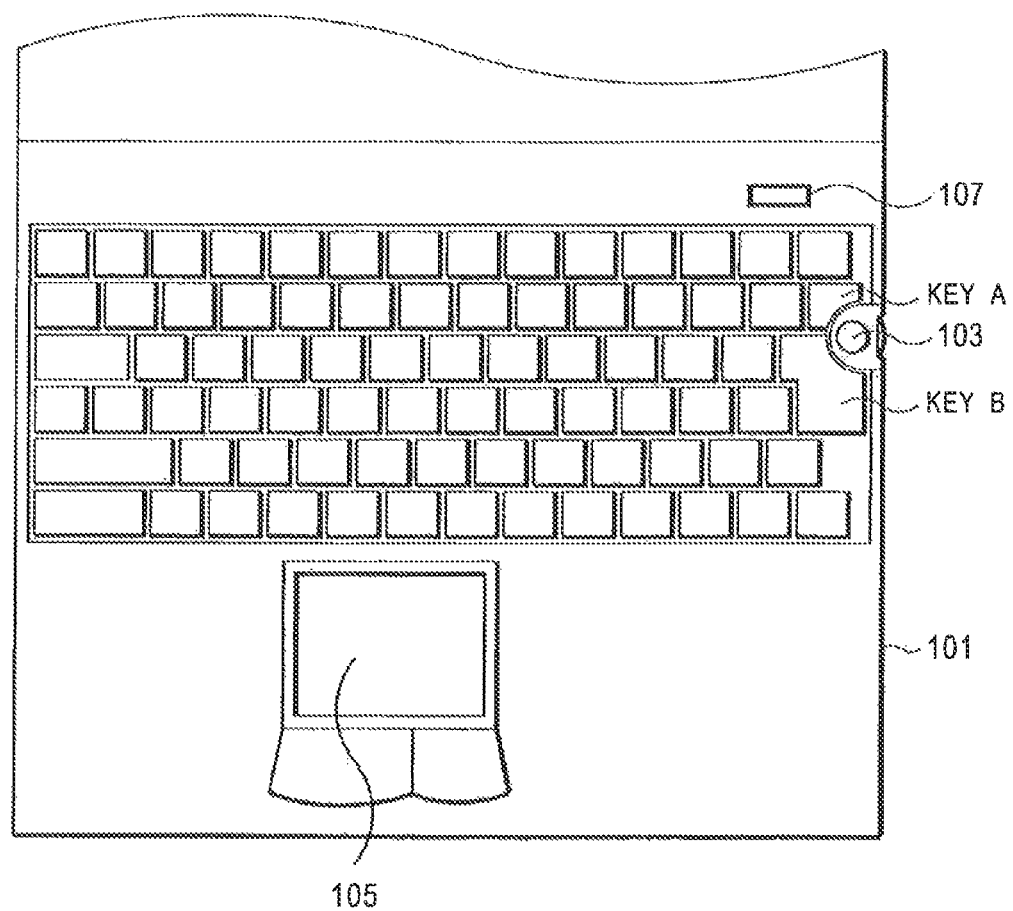
FIG. 8 is an illustration showing another example of the external view of the personal computer shown in FIG. 2.
Figure 9:
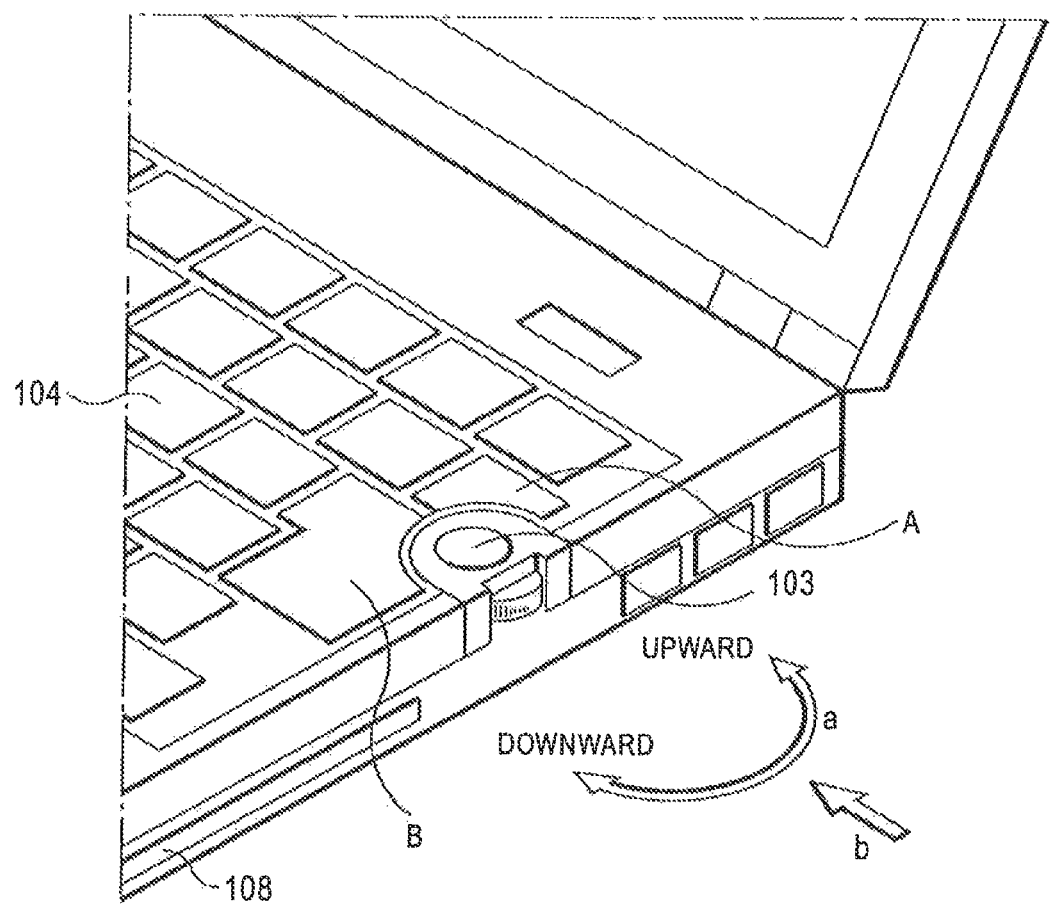
FIG. 9 is an illustration showing yet another example of the external view of the personal computer shown in FIG. 2.
Figure 10:
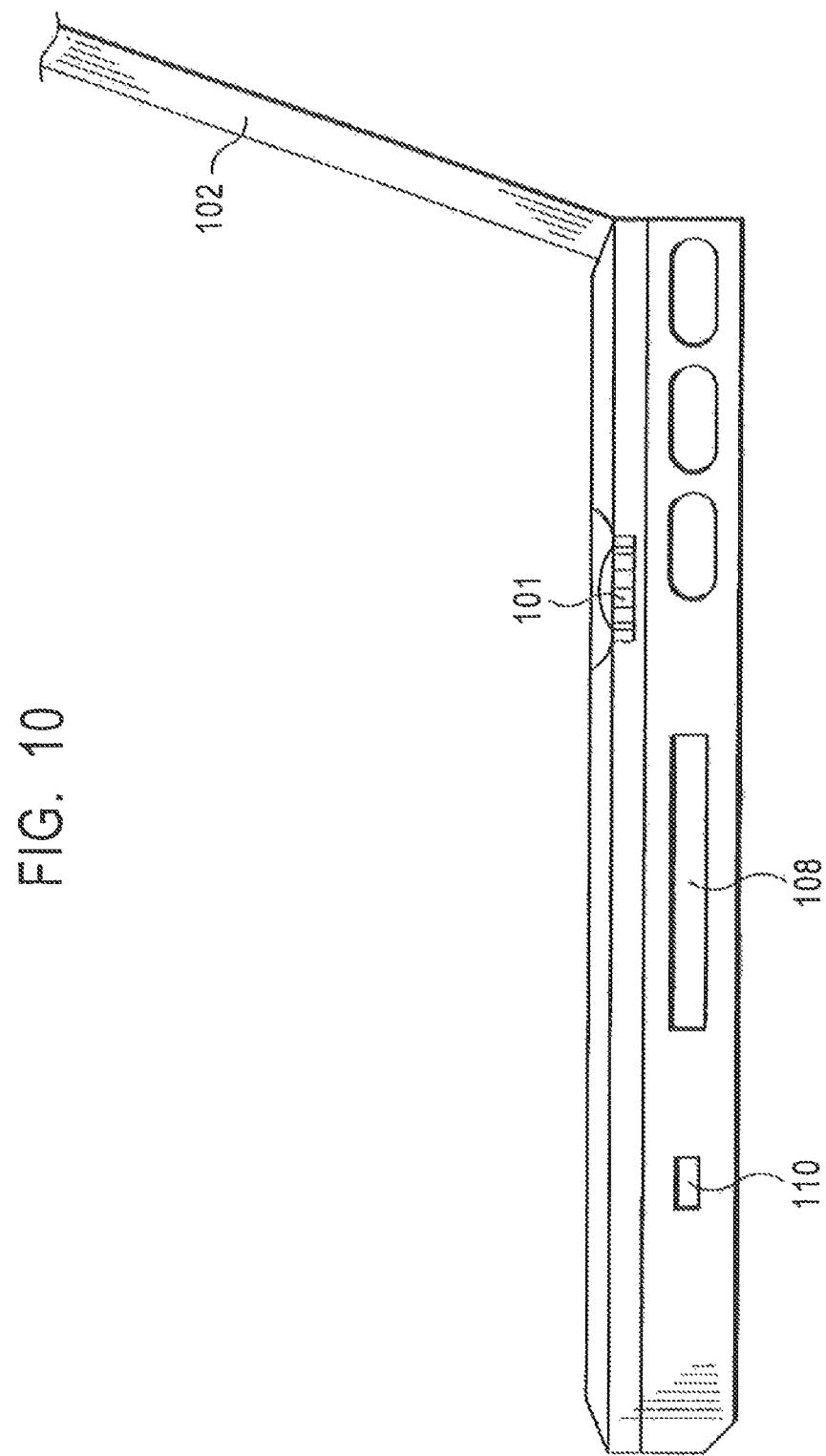
FIG. 10 is an illustration showing an example of a side surface of the personal computer shown in FIG. 2.

FIGS. 7 to 10 show external views of the personal computer 11 shown in FIG. 2. The notebook personal computer 11 basically includes a main unit 101 and a display 102 that can be opened and closed with respect to the main unit 101. FIG. 7 is an external perspective view in which the display 102 is shown as opened with respect to the main unit 101. FIG. 8 is a plan view of the main unit 101, and FIG. 9 is an enlarged view of the proximity of a jog dial 103, which will be described later. FIG. 10 is a side view of the main unit 101 on the side of the jog dial 103.

The main unit 101, on an upper surface thereof, has a keyboard 104 that is operated to input various characters, symbols, and the like, a touchpad 105 serving as a pointing device that is operated, for example, to move a pointer (mouse cursor), and a power switch 107. Furthermore, the main unit 101, on a side surface thereof, has a jog dial 103, a slot 108, and an IEEE (Institute of Electrical and Electronics Engineers) 1394 port 110. As an alternative to the touchpad 105, for example, a stick-type pointing device may be provided.

The display 102, on a front surface thereof, has an LCD 106 for displaying an image. Furthermore, the display 102, in an upper right part thereof, has LED lamps including a power lamp PL, a battery lamp BL, and a message lamp ML and other lamps as required. The power lamp PL, the battery lamp BL, the message lamp ML, etc. may be provided in a lower part of the display 102.

The jog dial 103 is fixed between keys of the keyboard 104 on the main unit 101, at a height substantially the same as that of keys. The jog dial 103 executes a predetermined process in accordance with a rotating operation indicated by an arrow a in FIG. 9, and also executes a process in accordance with a moving operation indicated by an arrow b. The jog dial 103 may be disposed on a left side surface of the main unit 101, on a left or right side surface of the display 102 having the LCD 106, or vertically between "G key" and "H key" of the keyboard 104. Alternatively, the jog dial may be provided in a central part of the front surface, horizontally along an upper edge or lower edge of the touchpad 105, or vertically between a right button and a left button of the touchpad 105, so that the jog dial 103 can be operated by a thumb while operating the touchpad 105 by an index finger. Furthermore, without limitation to vertical and horizontal directions, the jog dial 103 may be provided diagonally at a predetermined angle so as to facilitate operation by fingers. Also, the jog dial 103 may be disposed at a position where the jog dial 103 can be operated by a thumb on a side of a mouse serving as a pointing device.

Figure 11:
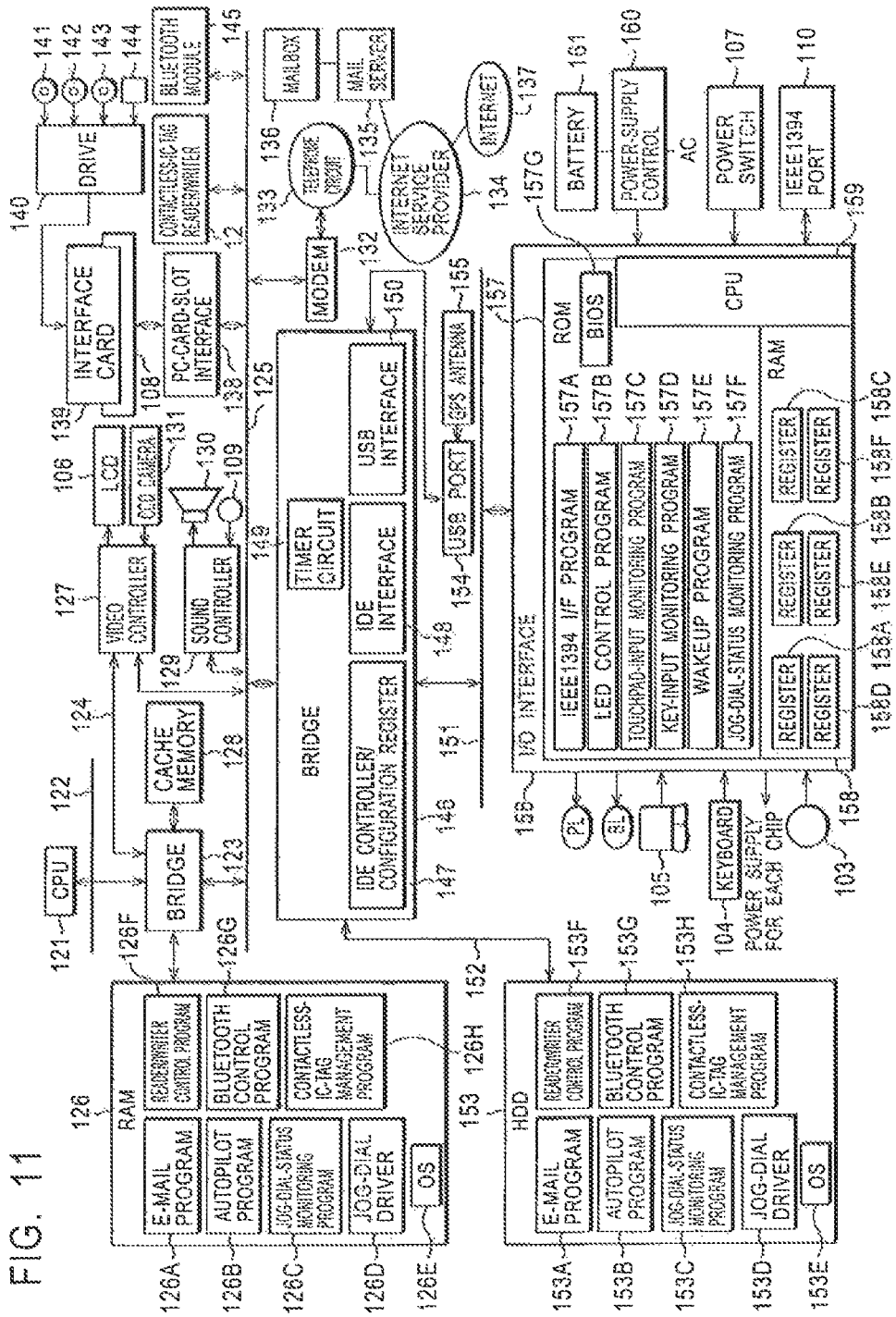
FIG. 11 is a block diagram showing an example configuration of the personal computer shown in FIG. 2.

FIG. 11 is a block diagram showing the electrical configuration of the personal computer 11.

A CPU 121 is implemented by, for example, a Pentium (registered trademark) processor manufactured by Intel Corporation, and it is connected to a host bus 122. Furthermore, a bridge 123 is connected to the host bus 122. The bridge 123 is also connected to an AGP (Accelerated Graphics Port) 124 and to a PCI bus 125. The bridge 123 is implemented, for example, by 400BX manufactured by Intel Corporation, and it controls components in the periphery of the CPU 121 and a RAM 126. Furthermore, the bridge 123 is connected to a video controller 127 via the AGP 124. The bridge 123 and a bridge 146 constitute what is called a chipset.

The bridge 123 is also connected to the RAM 126 and to a cache memory 128. The cache memory 128 caches data used by the CPU 121. Although not shown, the CPU 121 also includes a primary cache memory.

The RAM 126 is implemented, for example, by a DRAM (dynamic random access memory), and it stores programs executed by the CPU 121 and data needed for operation of the CPU 121. More specifically, when activation is complete, the RAM 126 stores an e-mail program 126A, an autopilot program 126B, a jog-dial-status monitoring program 126C, a jog-dial driver 126D, an operating program (OS) 126E, a reader/writer control program 126F, a Bluetooth control program 126G, and a contactless-IC-tag management program 126H, transferred from an HDD 153.

The e-mail program 126A is a program for exchanging messages through a communication line such as a phone line 133 over a network via a modem 132. The e-mail program 126A has a function of retrieving e-mails for reception. The function of retrieving e-mails for reception executes a process of inquiring a mail server 135 of an Internet service provider 134 as to whether an e-mail to itself (user) has been received in a mailbox 136, and retrieving the e-mail to itself if any.

The autopilot program 126B sequentially activates a plurality of predetermined processes (or programs) in a predetermined order and executes it.

The jog-dial-status monitoring program 126C receives notifications regarding compatibility with jog dials from the e-mail program 126A to the contactless-IC-tag management program 126H. If an application program is compatible with jog dials, the jog-dial-status monitoring program 126C operates so as to display user operations that can be executed by operating the jog dial 103 to the user, using a user interface function of the application program. The jog-dial-status monitoring program 126C is usually in a state of waiting for an event of the jog dial 103, and it has a list for receiving notifications from application programs. The jog-dial driver 126D executes various functions in accordance with operations of the jog dial 103.

The OS 126E is a program for controlling basic operations of a computer, such as Windows (registered trademark) 95 or Windows (registered trademark) 98 from Microsoft Corporation, or Mac OS (trademark) from Apple Computer, Inc.

The reader/writer control program 126F controls the reader/writer 12, detects presence of the contactless IC tag 3 placed in proximity to the personal computer 11, and exchanges various information with the contactless IC tag 3 by way of electromagnetic waves.

The Bluetooth control program 126G controls a Bluetooth module 145. For example, the Bluetooth control program 126G detects a Bluetooth device that exists in proximity, and establishes synchronization for communicating with the Bluetooth device.

The video controller 127 is connected to the PCI bus 125, and is also connected to the bridge 123 via the AGP 124. The video controller 127 controls display on the LCD 106 based on data transferred via the PCI bus 125 or the AGP 124.

Furthermore, a sound controller 129 is connected to the PCI bus 125, and a speaker 130 and a microphone 109 are connected to the speaker 130. The sound controller 129 captures input of sound from the microphone 109, and outputs an audio signal to the speaker 130.

Furthermore, a modem 132 and a PC card-slot interface 138 are connected to the PCI bus 125.

The modem 132 can be connected to the Internet 137, the mail server 135, and the like via the phone line 133 and the Internet service provider 134.

Furthermore, when an optional function is to be added, an interface card 139 is mounted as required in the slot 108 connected to the PC card-slot interface 138, allowing exchange of data with external apparatuses. For example, the interface card 139 can be connected to a drive 140, allowing exchange of data with a magnetic disk 141, an optical disk 142, a magneto-optical disk 143, a semiconductor memory 144, etc. placed in the drive 140.

The drive 140 for exchanging data with the magnetic disk 141, the optical disk 142, the magneto-optical disk 143, and the semiconductor memory 144 may be connected via a USB (Universal Serial Bus) port 154.

Furthermore, the bridge 146 is connected to the PCI bus 125. The bridge 146 is implemented, for example, by PIIX4E manufactured by Intel Corporation, and it controls various inputs and outputs. More specifically, the bridge 146 includes an IDE (Integrated Drive Electronics) controller/configuration register 147, an IDE interface 148, a timer circuit 149, and a USB interface 150. The bridge 146 controls devices connected to the IDE bus 152, a device connected to the USB port 154, devices connected via an ISA/EIO (Industry Standard Architecture/Extended Input Output) bus 151 and an I/O interface 156, and so forth.

For example, if a GPS (Global Positioning System) antenna 155 is connected to the USB port 154, the USB interface 150 forwards position data and time data fed from the GPS antenna 155 to the CPU 121 via the PCI bus 125, the bridge 123, and the host bus 122.

The IDE controller/configuration register 147 includes two IDE controllers, i.e., so-called a primary IDE controller and a secondary IDE controller, and also includes a configuration register.

The primary IDE controller is connected to a connector (not shown) via the IDE bus 152, and an HDD 153 is connected to the connector. The secondary IDE controller can be connected to an external apparatus via another IDE bus (not shown).

The HDD 153 stores an e-mail program 153A, an autopilot program 153B, a jog-dial-status monitoring program 153C, a jog-dial drier 153D, an OS 153E, a reader/writer control program 153F, a Bluetooth control program 153G, a contactless-IC-tag management program 153H, data used for these programs, etc. The programs 153A to 153H stored in the HDD 153 are sequentially transferred to and stored in the RAM 126 in the course of an activation process.

Furthermore, an I/O interface 156 is connected to the ISA/EIO bus 151. The I/O interface 156, a ROM 157, a RAM 158, and a CPU 159 are connected to each other.

The ROM 157 prestores, for example, an IEEE 1394 I/F program 157A, an LED control program 157B, a touchpad-input monitoring program 157C, a key-input monitoring program 157D, a wakeup program 157E, and a jog-dial-status monitoring program 157F.

The IEEE 1394 I/F program 157A is a program for inputting and outputting data compliant with IEEE 1394, exchanged via the IEEE 1394 input/output port 110. The LED control program 157B is a program for controlling lighting of LED lamps including a power lamp PL, a battery lamp BL, and a message lamp ML and other lamps as required. The touchpad-input monitoring program 157C is a program for monitoring inputs by the user via the touchpad 105. The key-input monitoring program 157D is a program for monitoring inputs by the user via the keyboard 104 or other key switches. The wakeup program 157E is a program for managing power supplies for chips in order to check whether a preset time has come based on current-time data fed from the timer circuit 149 in the bridge 146 and to activate a predetermined process (or program) when the preset time has come. The jog-dial-status monitoring program 157F is a program for constantly monitoring rotation of a rotary encoder of the jog dial 103 and pressing thereof.

Furthermore, the ROM 157 has a BIOS (basic input/output system) 157G written thereto. The BIOS refers to a basic input/output system, and it is a software program for controlling input and output of data between an OS or application programs and peripheral devices (e.g., display, keyboard, HDD).

The RAM 158 includes registers 158A to 158F, including registers related to LED control, touchpad input status, key input status, and time setting, an I/O register for monitoring status of the jog dial, and an IEEE 1394 I/F register. For example, when the jog dial 103 is pressed, the LED control register controls lighting of the message lamp ML indicating instant activation of an e-mail. The key-input status register, when the jog dial 103 is pressed, stores an operation-key flag. The time-setting register allows setting of an arbitrary time.

Furthermore, the I/O interface 156 is connected, via a connector that is not shown, to the jog dial 103, the keyboard 104, the touchpad 105, and the IEEE 1394 port 110. When the user performs operations using the jog dial 103, the keyboard 104, and the touchpad 105, the I/O interface 156 receives signals in accordance with the respective operations from the jog dial 103, the keyboard 104, and the touchpad 105, and outputs the signals to the ISA/EIO bus 151. Furthermore, the I/O interface 156 exchanges data with the outside via the IEEE 1394 input/output port 110. Furthermore, the I/O interface 156 is connected to the power lamp PL, the battery lamp BL, the message lamp ML, a power-supply control circuit 160, and other LED lamps.

The power-supply control circuit 160 is connected to a built-in battery 161 or an AC power source. The power-supply control circuit 160 supplies power as required to each block, and controls recharging of the built-in battery 161 or secondary batteries of peripheral apparatuses. The CPU 159, via the I/O interface 156, monitors the power switch 107 that is operated when turning power on or off.

The CPU is constantly allowed to execute the IEEE 1394 I/F program 157A to the BIOS 157G by an internal power source even when the power is off. That is, the IEEE 1394 I/F program 157A to the BIOS 157G are constantly in operation even when no window is opened on the LCD 106 of the display 102. Thus, the CPU 159 is constantly executing the jog-dial-status monitoring program 157E even when the power switch 107 is off and the OS 126E is not activated by the CPU 121. Thus, a programmable power key (PPK) function is provided without providing a dedicated key to the personal computer 11. Thus, the user is allowed to activate desired software or script file just by pressing the jog dial 103 even when in power-saving mode or when the power is off.

Figure 12:
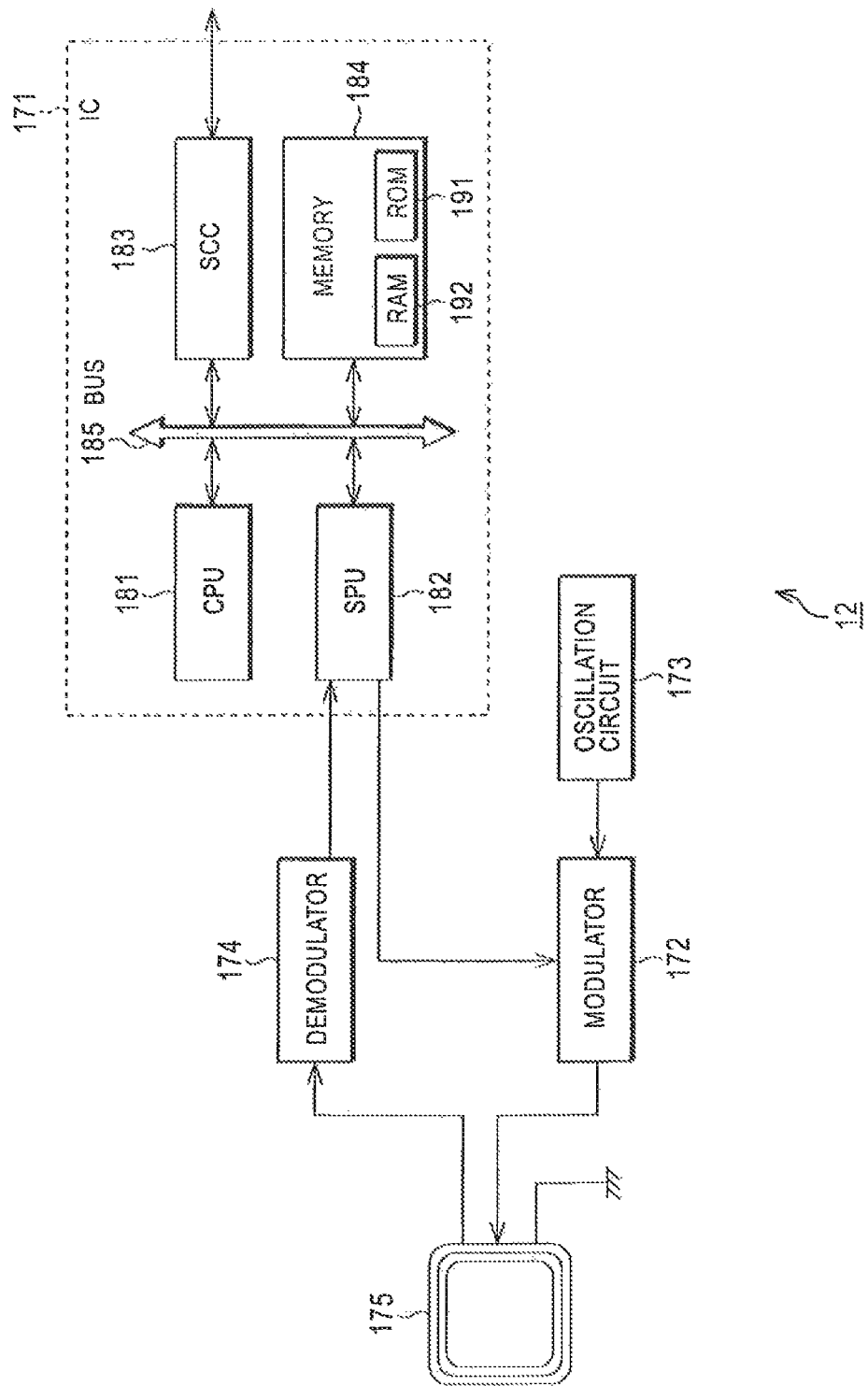
FIG. 12 is a block diagram showing an example configuration of a contactless-IC-tag reader/writer shown in FIG. 11.

FIG. 12 is a block diagram showing in detail the configuration of the reader/writer 12 shown in FIG. 11.

An IC 171 includes a CPU 181, an SPU (signal processing unit) 182, an SCC (serial communication controller) 183, and a memory 184. The memory 184 includes a ROM 191 and a RAM 192. The CPU 181 to the memory 184 are connected to each other via a bus 185.

The CPU 181 loads a control program stored in the ROM 191 into the RAM 192, and executes various processes based on response data transmitted from the contactless IC tag 3 and control signals fed from the CPU 121 shown in FIG. 11. For example, the CPU 181 generates a command to be transmitted to the contactless IC tag 3 and outputs the command to the SPU 182 via the bus 185, and it executes authentication of data transmitted from the contactless IC tag 3.

The CPU 181, when the cellular phone 1 is placed in proximity and a notification of a strap ID is received by processes in the components, which will be described later, sends a notification of the strap ID to the Bluetooth module 145 according to an instruction by the CPU 121.

The SPU 182, when response data from the contactless IC tag 3 is fed from a demodulator 174, executes, for example, BPSK demodulation (decoding of Manchester codes) on the data, and forwards the resulting data to the CPU 181. Furthermore, the SPU 182, when a command to be transmitted to the contactless IC tag 3 is fed via the bus 185, executes BPSK modulation (coding into Manchester codes) on the command, and outputs the resulting data to a modulator 172.

The SCC 183 forwards data transferred from the CPU 121 shown in FIG. 11 to the CPU 181 via the bus 185, and outputs data transferred via the bus 185 to the CPU 121.

The modulator 172 ASK-modulates a carrier wave having a predetermined frequency (e.g., 13.56 MHz), fed from an oscillation circuit (OSC) 173, based on data fed from the SPU 182, and outputs the resulting modulated wave from an antenna 175 in the form of an electromagnetic wave. The demodulator 174 demodulates a modulated wave (ASK-modulated wave) received via the antenna 175, and outputs demodulated data to the SPU 182.

The antenna 175 radiates a predetermined electromagnetic wave, and determines whether the contactless IC tag 3 (the cellular phone 1) is placed in proximity based on how the load changes in response thereto. When the contactless IC tag 3 is placed in proximity, the antenna 175 exchanges various data with the contactless IC tag 3.

FIG. 13 is a diagram showing an example of specifications of communications between the reader/writer 12 and the contactless IC tag 3.

As described earlier, communications between the reader/writer 12 and the contactless IC tag 3 are carried out in half duplex, with a communication rate of, for example, 211.875 kbps.

Furthermore, as shown in the figure, the center frequency of a frequency band used for transmission of power and transfer of data from the reader/writer 12 to the contactless IC tag 3 and for transfer of data from the contactless IC tag 3 to the reader/writer 12 is, for example, 13.56 MHz.

The electromagnetic wave output from the reader/writer 12 for transmission of power is, for example, 350 mW, and the range of communications is, depending on communication environment such as antenna characteristics, for example, on the order of 10 cm.

Data is transferred from the reader/writer 12 to the contactless IC tag 3 by ASK-modulating data encoded in Manchester codes, as described earlier, with a modulation degree (maximum amplitude of data signal/maximum amplitude of carrier wave), on the order of, for example, 0.1. Furthermore, data is transferred from the contactless IC tag 3 to the reader/writer 12 by converting output data into transmission signals by load switching (turning a switching element on/off in accordance with the output data to change the load of the antenna 175), as described earlier.

Figure 14:
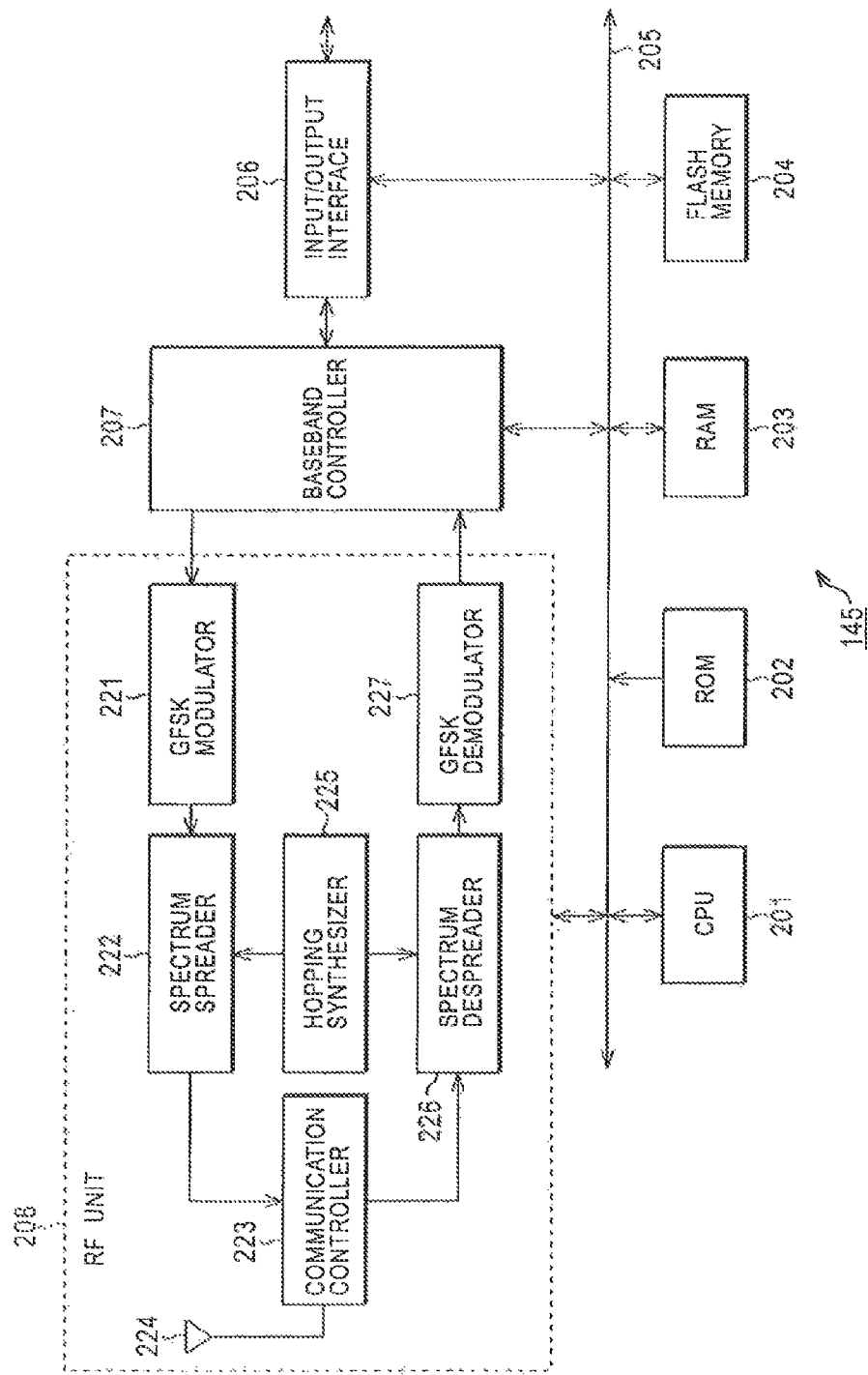
FIG. 14 is a block diagram showing an example configuration of a Bluetooth module shown in FIG. 11.

FIG. 14 is a block diagram showing in detail the configuration of the Bluetooth module 145 shown in FIG. 11.

A CPU 201 loads a control program stored in a ROM 202 into a RAM 203 to control the overall operation of the Bluetooth module 145. The CPU 201 to the RAM 203 are connected to each other via a bus 205, and a flash memory 204 is also connected to the bus 205.

The flash memory 204 stores, for example, a Bluetooth device name that is set for each Bluetooth device, and a Bluetooth address that is unique to each Bluetooth device.

A Bluetooth address is an identifier consisting of 48 bits, is unique (unambiguous) for each Bluetooth device, and is used in various processes for management of a Bluetooth device.

For example, as described earlier, all slaves must obtain information regarding a frequency-hopping pattern of a master in order to establish synchronization within a piconet, and the frequency-hopping pattern is calculated by the slaves based on the Bluetooth address of the master.

More specifically, a Bluetooth address is divided into an LAP (low address part) consisting of the lower 24 bits, a UAP (upper address part) consisting of the next 8 bits, and an NAP (non-significant address part) consisting of the remaining 16 bits. A frequency-hopping pattern is calculated using 28 bits including the entire 24 bits of the LAP and the lower 4 bits of the UAP.

Each of the slaves is allowed to calculate a frequency-hopping pattern based on the above-described 28-bit part of the Bluetooth address of the master, obtained during "paging" for establishing synchronization within the piconet, and based on a Bluetooth clock transmitted from the master.

Referring back to FIG. 14, the flash memory 204 stores a link key or the like for authenticating a Bluetooth device of a communicating party or encrypting data to be transmitted after synchronization within the piconet has been established, and the link key or the like is provided to the CPU 201 as required.

An input/output interface 206, according to instructions from the CPU 201, manages input and output of data transferred from the CPU 121 shown in FIG. 11 and data transferred from a baseband controller 207.

The baseband controller 207 forwards data transferred from the input/output interface 206 to a GFSK (Gaussian frequency shift keying) modulator 221 for transmission to the cellular phone 1, and outputs data transferred from a GFSK demodulator 227 to the bus 205 or the input/output interface 206.

The GFSK modulator 221 filters high-band components of data transferred from the baseband controller 207, performs frequency modulation as a primary modulation, and outputs the resulting data to a spectrum spreader 222.

The spectrum spreader 222 changes the carrier frequency based on the frequency-hopping pattern calculated as described earlier and fed from a hopping synthesizer 225, performs spectrum spreading on data transferred thereto, and then outputs the resulting signals to a communication controller 223. In Bluetooth, the spectrum spreader 222 hops the frequency at a cycle of 625 μs for transmission of data.

The communication controller 223 sends signals that have undergone spectrum spreading from an antenna 224 using the 2.4 GHz band. Furthermore, the communication controller 223 outputs signals received by the antenna 224 to a spectrum despreader 226.

The spectrum despreader 226 hops the receiving frequency based on the frequency-hopping pattern fed from the hopping synthesizer 225, thereby obtaining signals transmitted from, for example, the cellular phone 1. Furthermore, the spectrum despreader 226 performs spectrum despreading on the signals obtained to restore signals from the cellular phone 1, and outputs the signals restored to the GFSK demodulator 227. The GFSK demodulator 227 GFSK-demodulates the signals transferred from the spectrum despreader 226, and outputs the resulting data to the baseband controller 207.

The configuration of the Bluetooth module 56 is the same as that shown in FIG. 14, and thus will not be described in detail. In the following description, for example, a CPU of the Bluetooth module 56 will be referred to as a CPU 201A, and a ROM thereof as a ROM 202A. Other parts will be referred to in a similar manner.

Next, operation of the communication system shown in FIG. 2 will be described.

First, with reference to a flowchart shown in FIG. 15, processing according to the contactless-IC-tag management program 126H of the personal computer 11, for registering the strap ID of the contactless IC tag 3 and the Bluetooth device name of the cellular phone 1 in association with each other, will be described.

When using the communication system shown in FIG. 2, the user is required to register, for example, the strap ID of the strap 2 newly purchased and the Bluetooth device name of the cellular phone 1 in the personal computer 11 in advance.

Figure 16:
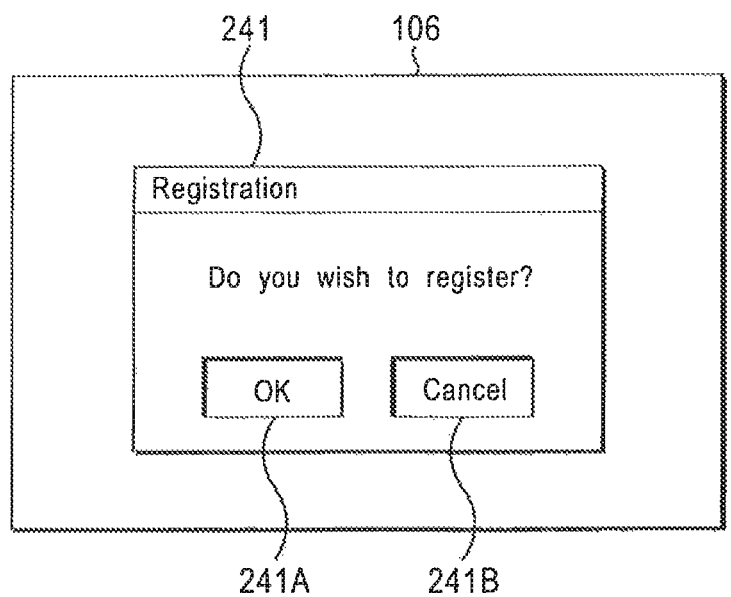
FIG. 16 is an illustration showing an example screen that is displayed on the personal computer.

In step S1, the contactless-IC-tag management program 126H displays on the LCD 106 a selection screen for allowing the user to select whether or not to register. FIG. 16 is an illustration showing an example of the selection screen displayed on the LCD 106 in step S1. In this example, a registration window 241 is displayed, and a message that reads "Do you wish to register?" is displayed therein. Furthermore, in the registration window 241, an "OK" button 241A and a "Cancel" button 241B are displayed.

Then, when the user operates the "OK" button 241A while the selection screen shown in FIG. 16 is in display, the-contactless-IC-tag management program 126H proceeds to step S2, activating the reader/writer control program 126F.

Figure 17:
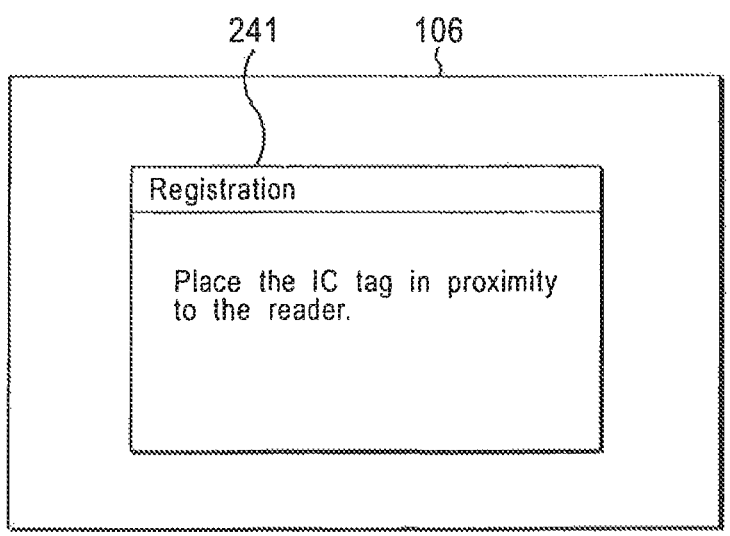
FIG. 17 is an illustration showing another example screen that is displayed on the personal computer.

In step S3, the contactless-IC-tag management program 126H displays on the LCD 106, subsequent to the screen shown in FIG. 16, a message requesting that the contactless IC tag 3 (the strap 2) be placed in proximity to the reader/writer 12. FIG. 17 is an illustration showing an example of the screen displayed on the LCD 106 in step S3. In the registration window 241, a message that reads "Place the IC tag in proximity to the reader (the reader/writer 12)." is displayed.

In step S4, the contactless-IC-tag management program 126H determines whether a notification of a strap ID has been received, and waits until it is determined that a notification has been received. When the contactless IC tag 3 is placed in proximity, the reader/writer control program 126F, activated in step S2, reads the strap ID, and sends a notification of the strap ID.

Figure 18:
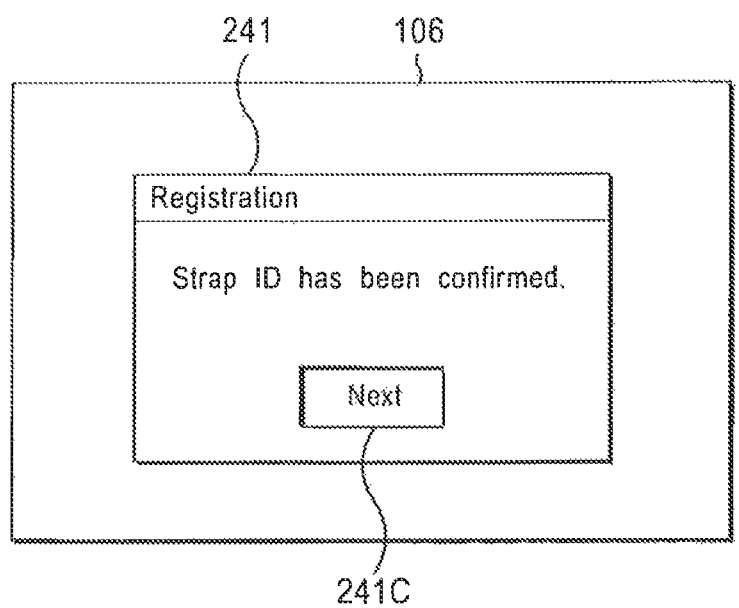
FIG. 18 is an illustration showing yet another example screen that is displayed on the personal computer.

If it is determined in step S4 that a notification of a strap ID has been received, the contactless-IC-tag management program 126H proceeds to step S5, displaying a message notifying that the strap ID has been confirmed. FIG. 18 is an illustration showing an example of the message displayed in step S5. As shown in the figure, a message that reads, for example, "Strap ID has been confirmed." is displayed in the registration window 241. Furthermore, a "Next" button 241C for proceeding to a next step is displayed below the message.

In step S6, the contactless-IC-tag management program 126H displays a screen for entering a Bluetooth device name to be registered in association with the strap ID that has been transmitted. FIG. 18 is an illustration showing an example of the screen for entering a Bluetooth device name. In the registration window 241, a message that reads "Enter a Bluetooth device name." is displayed, and a field 241D for entering a Bluetooth device name is displayed below the field 241D. The user checks, for example, the Bluetooth device name of the cellular phone 1, and enters the Bluetooth device name using the keyboard 104.

Figure 19:
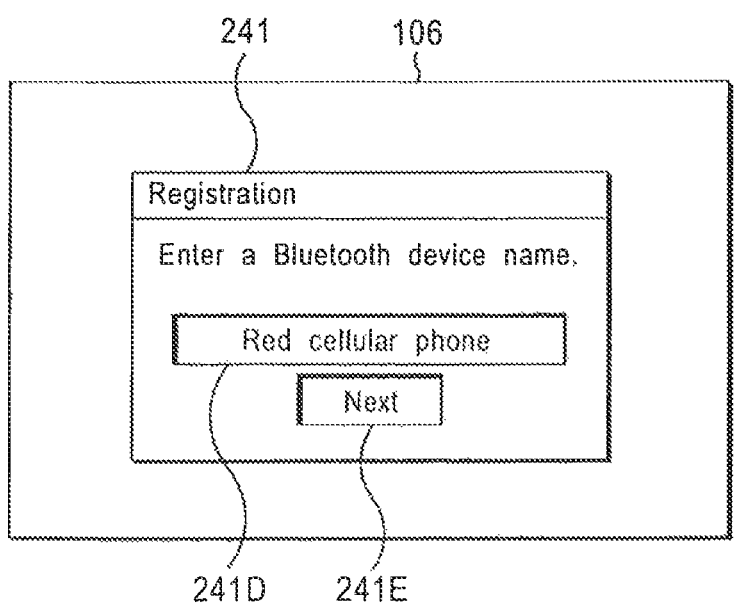
FIG. 19 is an illustration showing an example screen that is displayed on the personal computer.

In step S7, the contactless-IC-tag management program 126H determines whether a Bluetooth device name has been entered, and waits until a Bluetooth device name is entered. For example, when the user enters a Bluetooth device name that reads "Red cellular phone", as shown in FIG. 19, and operates the "Next" button 241E displayed below the field 241D for entering a Bluetooth device name, the contactless-IC-tag management program 126H determines that a Bluetooth device name has been entered, and proceeds to step S8.

In step S8, the contactless-IC-tag management program 126H registers the strap ID and the Bluetooth device name in association with each other, for example, in the HDD 153.

Figures 20, 21:
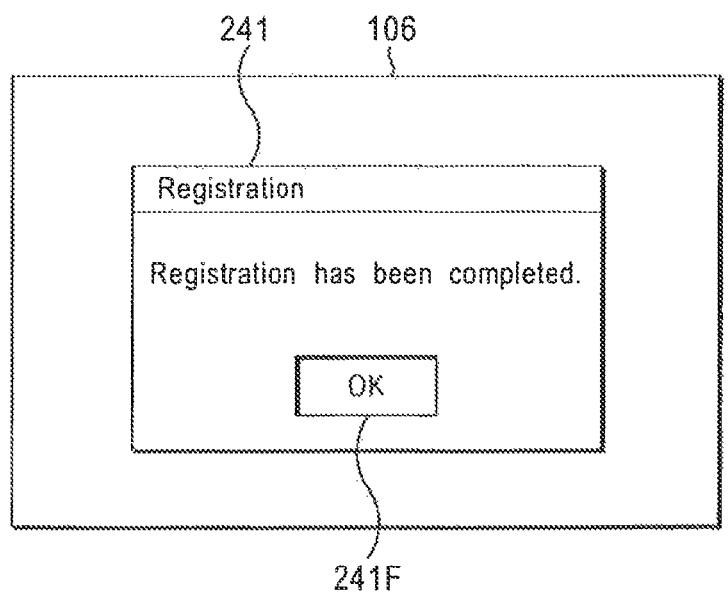
FIG. 20 is an illustration showing another example screen that is displayed on the personal computer.
FIG. 21 is a diagram showing an example of association table that is stored in the personal computer.

When the strap ID transmitted from the contactless IC tag 3 and the Bluetooth device name entered by the user have been registered, the contactless-IC-tag management program 126H proceeds to step S9, displaying a message notifying that registration has been completed. FIG. 20 is an illustration showing an example of the message displayed in step S9. In this example, a message that reads "Registration has been completed." is displayed in the registration window 241. When an "OK" button 241F displayed in the registration window 241F is operated, the contactless-IC-tag management program 126H exits processing.

By executing the processing described above, for example, a table of association between strap IDs and Bluetooth device names, shown in FIG. 21, is stored in the HDD 153. Obviously, a strap ID may be manually entered by a user using the keyboard 104 or the like.

In the association table shown in FIG. 21, a strap ID "A045PR63" and a Bluetooth device name "Red cellular phone" are stored as first registered information, and a strap ID "WW9565B" and a Bluetooth device name "Yellow PDA" are stored as second registered information.

When the strap 2 is placed in proximity and a notification of the strap ID "A045PR63" is received, the Bluetooth control program 126G, with reference to the association table, selects "Red cellular phone", i.e., the cellular phone 1, as a party for establishing communication therewith.

Figure 22:
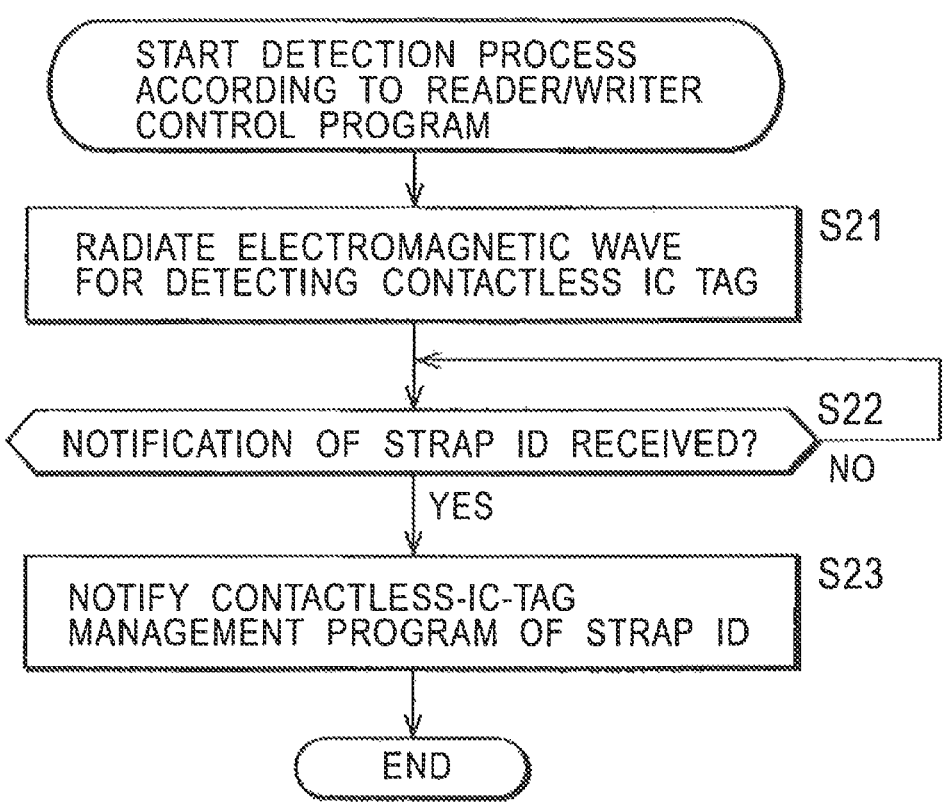
FIG. 22 is a flowchart showing another process that is executed by the personal computer.

Next, with reference to a flowchart shown in FIG. 22, processing according to the reader/writer control program 126F, activated in step S2 shown in FIG. 15, will be described.

In step S21, the reader/writer control program 126F controls the components of the reader/writer 12 to radiate an electromagnetic wave for detecting the contactless IC tag 3.

Then, in step S22, the reader/writer control program 126F determines whether a notification of the strap ID has been received from the contactless IC tag 3, and waits until a notification is received. If it is determined in step S22 that the strap 2 has been placed in proximity and that a notification of the strap ID has been received from the contactless IC tag 3, the reader/writer control program 126F proceeds to step S23, sending a notification of the strap ID to the contactless-IC-tag management program 126H, and then exits processing.

Figure 23:
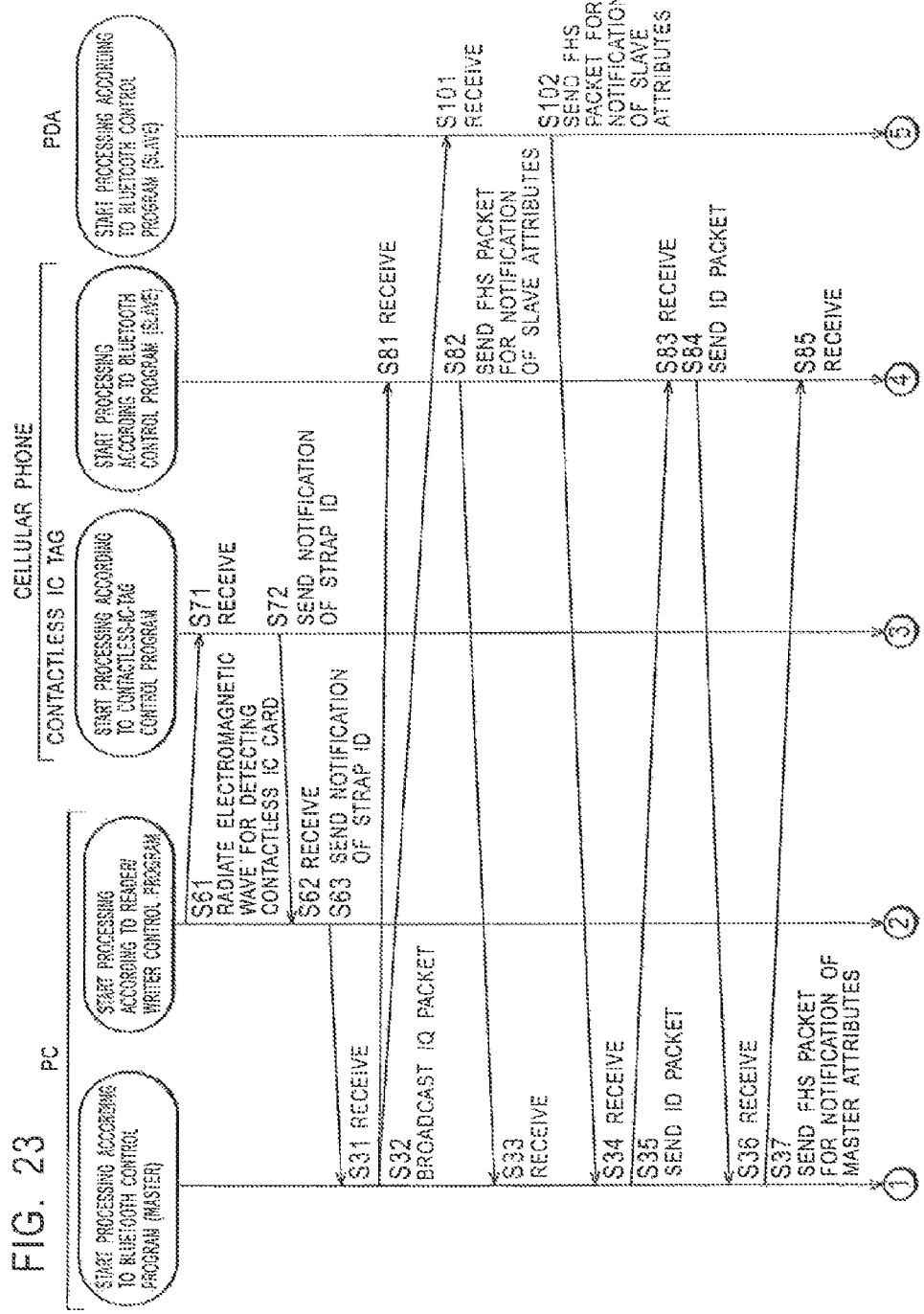
FIG. 23 is a flowchart showing a process that is executed by the communication system shown in FIG. 2.
Figure 24:
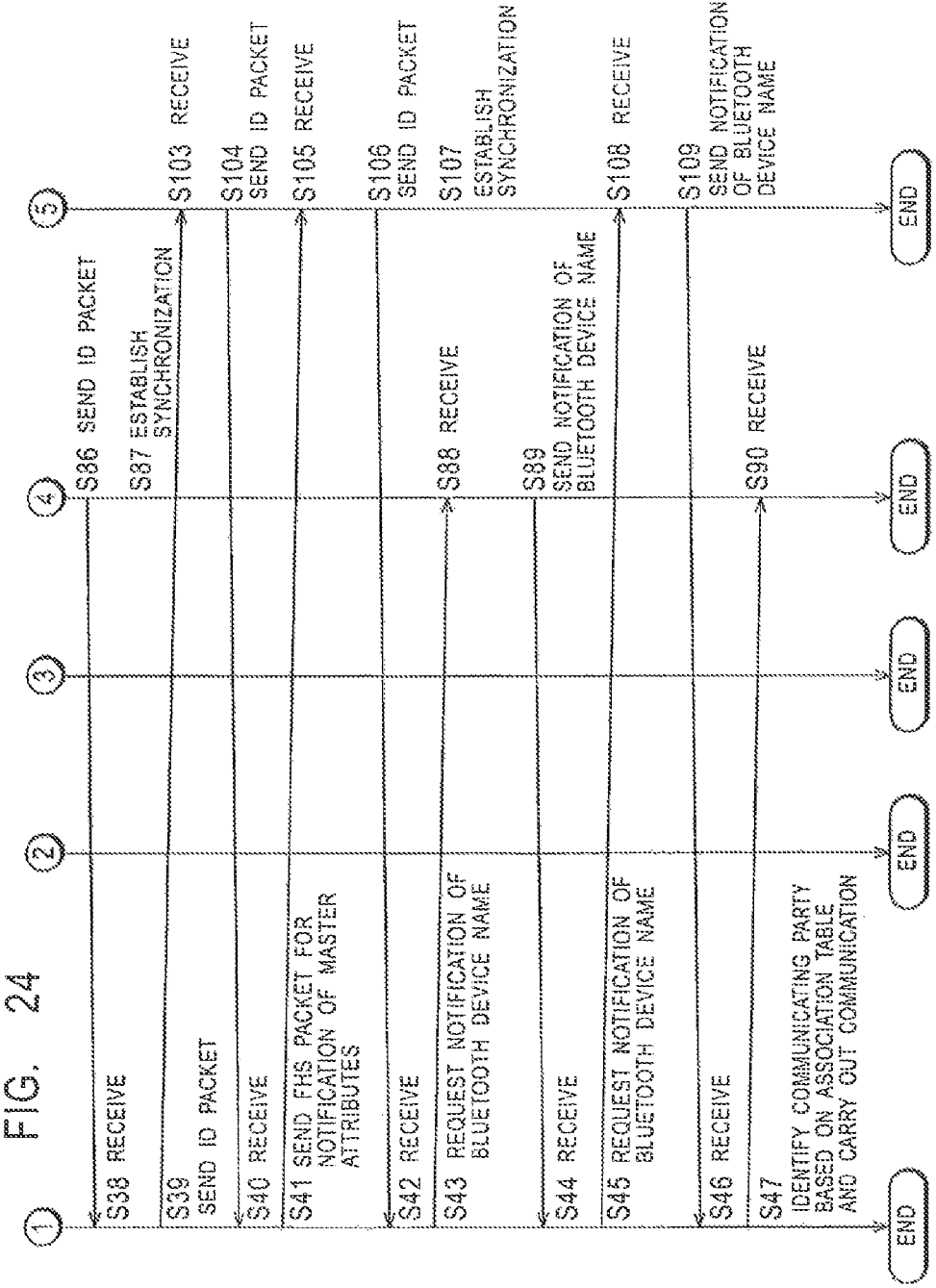
FIG. 24 is a flowchart subsequent to FIG. 23, showing a process that is executed by the communication system shown in FIG. 2.

Next, with reference to flowcharts shown in FIGS. 23 and 24, a series of processing steps executed by the communication system shown in FIG. 2, in a case where the association table shown in FIG. 21 is stored in the personal computer 11, will be described.

In order to clarify difference from processing executed by the cellular phone 1 with the strap 2 attached thereto, processing executed by a PDA (personal digital assistant) (Bluetooth device) that is not shown, without a contactless IC tag attached thereto using a strap or included therein, will also be described with reference to the flowcharts shown in FIGS. 23 and 24.

In this example, the personal computer 11 acts as a master, and the cellular phone 1 and the PDA act as slaves. In the following description relating to the flowcharts, a communication, where appropriate, refers to a communication based on Bluetooth that is carried out after establishing synchronization within a piconet and identifying a communicating party.

In step S61, the reader/writer control program 126F radiates an electromagnetic wave for detecting the contactless IC tag 3. The reader/writer control program 126F controls the reader/writer 12 by a predetermined command to radiate electromagnetic waves at a predetermined cycle.

The contactless-IC-tag control program 72A of the strap 2, when the strap 2 is placed in proximity to the personal computer 11 and an electromagnetic wave is received therefrom in step S71, proceeds to step S72, reading the strap ID from the EEPROM 74 and sending a notification of the strap ID to the reader/writer 12.

In step S62, the reader/writer control program 126F receives the notification of the tag ID transmitted from the contactless IC tag 3, and proceeds to step S63, sending a notification of the tag ID to the Bluetooth control program 126G.

Then, in step S31, the Bluetooth control program 126G receives the tag ID.

Thereafter, the Bluetooth control program 126G executes an "inquiry" in steps S32 to S34, and executes "paging" in steps S35 to S42. Basically, the "inquiry" is a process for detecting Bluetooth devices (the cellular phone 1 and the PDA) in the proximity of the personal computer 11, and "paging" is a process for sending a notification of information regarding master attributes (Bluetooth address, Bluetooth clock, etc.). to the Bluetooth devices detected by the "inquiry".

In step S32, the Bluetooth control program 126G controls the Bluetooth module 145 to broadcast an IQ packet.

More specifically, the Bluetooth control program 126G generates an inquiry frequency-hopping pattern using preset 24 bits (9E8B33) of the LAP and four bits (all zeros) of the UAP and the entire 28 bits of the Bluetooth clock.

Furthermore, the Bluetooth control program 126G generates an IAC (inquiry access code) using one address block among predetermined LAPs of 9E8B00 to 9E8B3F, and broadcasts an IQ packet including the access code using the inquiry hopping pattern that has been calculated.

Each packet exchanged based on Bluetooth inlcudes an access code, consisting of 68 bits or 72 bits, that serves as a basis for representing a destination of a transmission packet, a packet header consisting of 54 bits, including parameters for managing a communication link, and a payload consisting of 0 to 2,745 bits (variable length) of user data.

The IQ packet broadcast from the antenna 224 of the Bluetooth module 145 is received by the Bluetooth control program 41B of the cellular phone 1 in step S81, and received by a Bluetooth control program of the PDA in step S101.

Then, in step S82, the Bluetooth control program 41B responds to the inquiry by sending an FHS packet for notification of slave attributes to the personal computer 11. The FHS packet includes, in the payload thereof, information regarding the Bluetooth address and the Bluetooth clock of the Bluetooth module 56.

The FHS packet that has been sent is received by the Bluetooth control program 126G of the personal computer 11 in step S33, whereby information regarding attributes of the cellular phone 1 is obtained.

Similarly, an FHS packet indicating attributes of the PDA is sent in step S102, which is received by the Bluetooth control program 126G in step S34.

By the "inquiry" described above, the Bluetooth control program 126G obtains information regarding attributes of all the slaves that exist nearby.

In step S35, the Bluetooth control program 126G creates an ID packet based on information included in the FHS packet obtained from the cellular phone 1, and sends the ID packet to the cellular phone 1.

More specifically, the Bluetooth control program 126G calculates a paging frequency-hopping pattern using the 24 bits of the LAP and the lower 4 bits of the UAP of Bluetooth address that is set in the Bluetooth module 56 and the 28 bits of the Bluetooth clock.

Furthermore, the Bluetooth control program 126G generates a DAC (device access code) using the LAP of the Bluetooth module 56, and sends an ID packet including the DAC to the cellular phone 1 using the paging frequency-hopping pattern that has been calculated.

The Bluetooth control program 41B of the cellular phone 1, upon receiving the ID packet in step S83, proceeds to step S84, sending the same ID packet to the personal computer 11, thereby notifying the personal computer 11 that the ID packet has been normally received.

The Bluetooth control program 126G, upon receiving the ID packet transmitted from the cellular phone 1, proceeds to step S37, sending an FHS packet for notification of its own attributes to the cellular phone 1.

In step S85, the Bluetooth control program 41B of the cellular phone 1 receives the FHS packet transmitted from the personal computer 11, obtaining attribute information of the master. The Bluetooth control program 41B proceeds to step S86, sending an ID packet to the personal computer 11, thereby notifying the personal computer 11 that the FHS packet has been received.

Then, the Bluetooth control program 41B proceeds to step S87, establishing synchronization within the piconet with the personal computer 11.

More specifically, the Bluetooth control program 41B generates a channel frequency-hopping pattern using the 24 bits of the LAP and the lower 4 bits of the UAP of the Bluetooth address that is set in the personal computer 11 (the Bluetooth module 145) and 27 bits of the Bluetooth clock, thereby establishing synchronization with respect to the frequency axis.

Furthermore, the Bluetooth control program 41B adds an offset (difference) to the Bluetooth clock it manages, based on the notification of Bluetooth clock transmitted from the personal computer 11, thereby establishing synchronization with respect to the time axis.

In step S38, the Bluetooth control program 126G receives the ID packet transmitted from the cellular phone 1.

The personal computer 11, acting as a master, when establishing synchronization with a plurality of slaves, repeatedly executes the "paging" described above for each of the slaves, sequentially increasing the number of salves constituting the piconet. That is, "paging" is similarly executed between the personal computer 11 and the PDA in steps S39 to S42 and steps S103 to S107, whereby synchronization within the piconet is established.

When synchronization has been established with all the slaves within the piconet, the Bluetooth control program 126G requests notification of Bluetooth device names that are set in the respective slaves. In step S43, the Bluetooth control program 126G requests the cellular phone 1 to send a notification thereof.

Alternatively, notification of a Bluetooth device name may be requested immediately after synchronization is established with each individual Bluetooth device (immediately after completion of "paging").

The Bluetooth control program 41B, upon receiving the request in step S88, proceeds to step S89, reading the Bluetooth device name that is set in the flash memory 204A (the flash memory of the Bluetooth module 56) and sending a notification thereof.

The Bluetooth device name transmitted from the cellular phone 1 is received by the Bluetooth control program 126G in step S44.

In step S45, the Bluetooth control program 126G requests the PDA to send a notification of the Bluetooth device name, and receives a response to the request in step S46.

In step S47, the Bluetooth control program 126G, with reference to the association table, finds a slave having a Bluetooth device name associated with a strap ID that has been transmitted in advance from among a plurality of slaves for which notification of Bluetooth device name has been received, identifying the slave as a terminal of a communicating party, and carries out communication with the slave.

Assuming that a notification of "Red cellular phone" has been received from the cellular phone 1 and a notification of "Yellow PDA" has been received from the PDA in response to the request for notification of Bluetooth device names, when a notification of the strap ID "A045PR63" is received from the contactless IC tag 3, the Bluetooth control program 126G is allowed to identify the cellular phone 1, for which the Bluetooth device name of "Red cellular phone" is set, as a terminal of a communicating party with reference to the association table shown in FIG. 21.

Although Bluetooth dictates that a profile indicating a method of data transmission be selected after establishing synchronization among terminals, alternatively, for example, profiles that can be provided by terminals may be registered in the association table described above in association with their respective strap IDs. That is, the Bluetooth control program 126G of the personal computer 11, upon receiving a notification of a strap ID, obtains a profile that is registered in association with the strap ID, and carries out communication with the cellular phone 1 using the profile obtained.

By the processing described above, even if a plurality of Bluetooth devices, including the PDA, exists in the proximity of the personal computer 11, communication is started only between the personal computer 11 and the cellular phone 1 without performing terminal selection or the like.

Although it has been described that the personal computer 11 identifies a communicating party based on the Bluetooth device name of the cellular phone 1, transmitted from the contactless IC tag 3, and communicates with the terminal, the personal computer 11 may identify a communicating party based on a Bluetooth address transmitted from the contactless IC tag 3 and start communication therewith.

Next, with reference to a flowchart shown in FIG. 25, processing according to the contactless-IC-tag management program 126H for registering the strap ID of the contactless IC tag 3 and the Bluetooth address of the cellular phone 1 in association with each other will be described.

Figure 15:
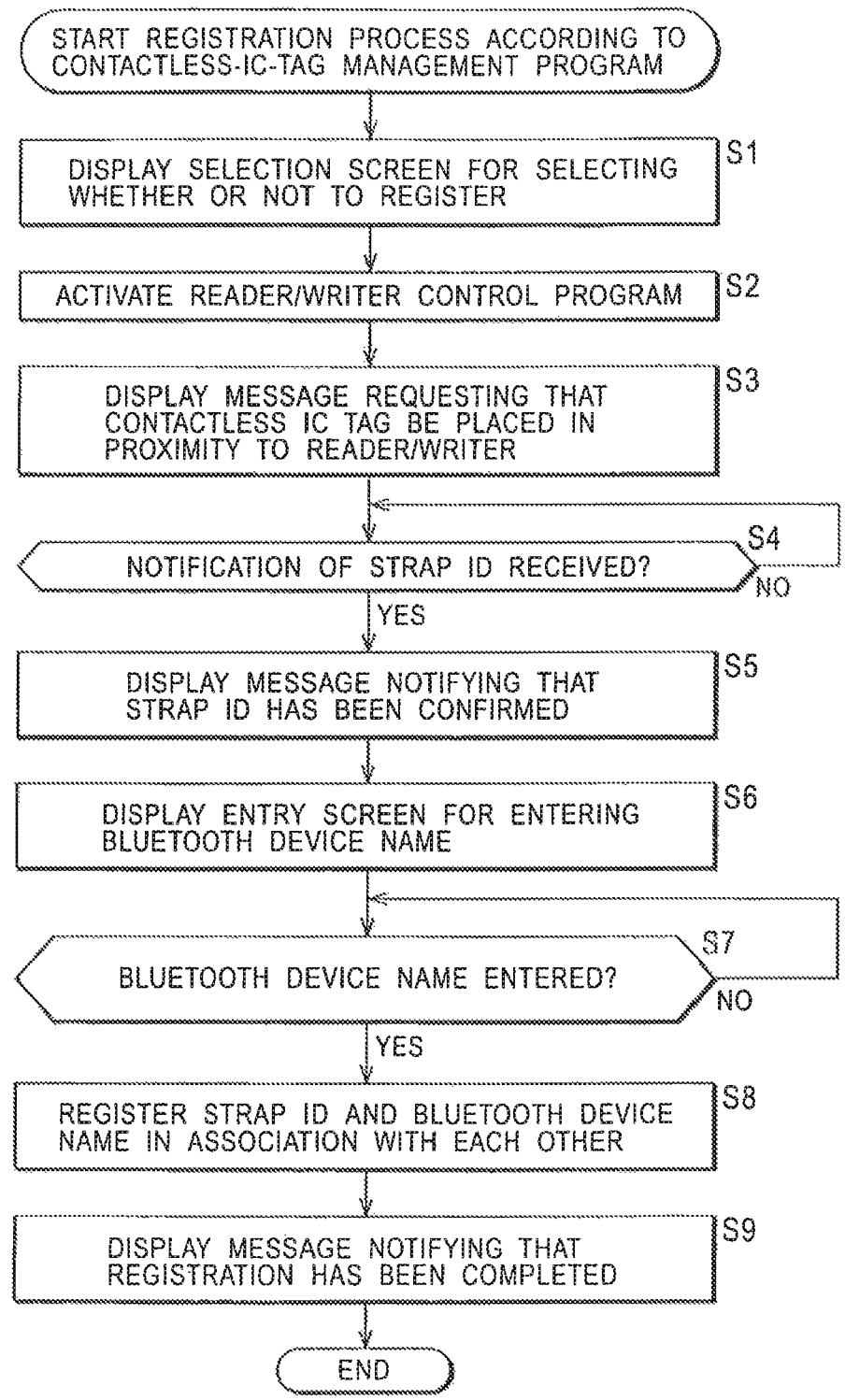
FIG. 15 is a flowchart showing a process that is executed by the personal computer.
Figure 25:
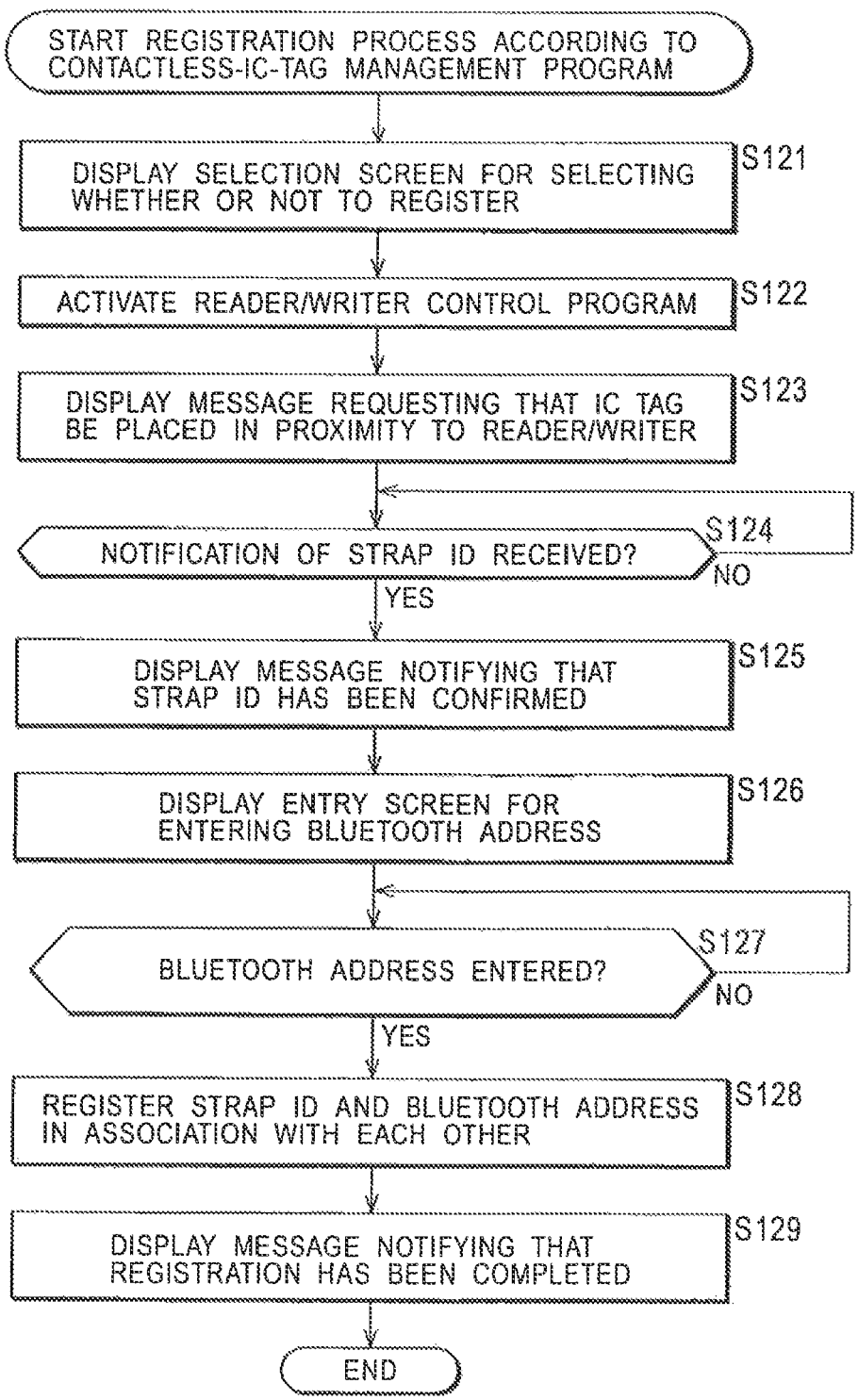
FIG. 25 is a flowchart showing yet another, process that is executed by the personal computer.

The processing shown in FIG. 25 is the same as the processing shown in FIG. 15 except in that information that is registered in association with the strap ID of the contactless IC tag 3 is a Bluetooth address.

More specifically, when registration is selected in the selection screen shown in FIG. 16, the reader/writer control program 126F is activated, and a message shown in FIG. 17 is displayed on the LCD 106. Then, when the strap 2 is placed in proximity to the reader/writer 12 and a notification of the strap ID thereof is received, the contactless-IC-tag management program 126H displays a message shown in FIG. 18, and displays an entry screen for entering a Bluetooth address in step S126.

Figures 26, 27:
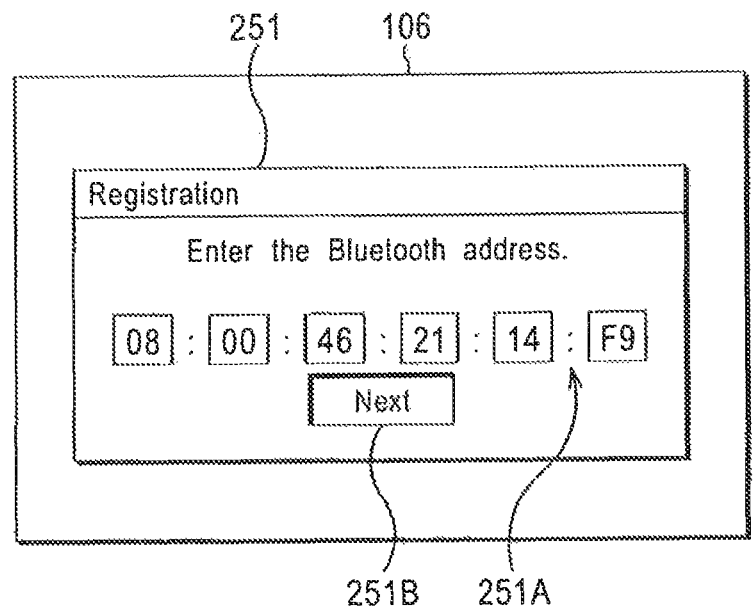
FIG. 26 is an illustration showing an example screen that is displayed on the personal computer.
FIG. 27 is an illustration showing another example of association table that is stored in the personal computer.

FIG. 26 is an illustration showing an example of the entry screen displayed in step S126. In this example, a message that reads "Enter the Bluetooth address." is displayed in a registration window 251, and a Bluetooth-address entry field 251A is displayed below the registration window 251A. The user checks the Bluetooth address of the cellular phone 1 and enters the Bluetooth address by operating the keyboard 104 or the like.

Then, in step S127, the contactless-IC-tag management program 126H determines whether a Bluetooth address has been entered. For example, when a Bluetooth address "08:00:46:21:14:F9" is entered as shown in FIG. 26, as shown in FIG. 26, and a "Next" button 252B is operated, the contactless-IC-tag management program 126H determines that a Bluetooth address has been entered, and proceeds to step S128.

In step S128, the contactless-IC-tag management program 126H registers the strap ID transmitted from the contactless IC tag 3 and the Bluetooth address entered in association with each other. Then, in step S129, the contactless-IC-tag management program 126H displays a screen shown in FIG. 20, indicating completion of registration, and then exits processing.

FIG. 27 is an illustration showing an example of association table that is registered by executing the processing described above.

In the association table shown in FIG. 27, a strap ID "A045PR63" and a Bluetooth address "08:00:46:21:14:F9" are stored as first registered information, and a strap ID "WW9565BKO" and a Bluetooth address "08:01:57:22:38:F9" are stored as second registered information. As described earlier, it is possible to register additional information, for example, profiles.

When the strap 2 is placed in proximity and a notification of the strap ID thereof is received from the contactless IC tag 3, the Bluetooth control program 126G is allowed to identify a party with which communication is to be established with reference to the association table.

Next, with reference to flowcharts shown in FIGS. 28 and 29, a series of processing steps executed by the communication system shown in FIG. 2 in a case where the association table shown in FIG. 27 is stored in the personal computer 11 will be described.

The processing shown in FIG. 28 is similar to the processing up to "inquiry" described with reference to FIG. 23.

More specifically, when the strap 2 is placed in proximity to the reader/writer 12, the strap ID is transmitted from the contactless IC tag 3 to the personal computer (the reader/writer control program 126F), and the Bluetooth control program 126G executes "inquiry" in steps S142 to S144.

Upon obtaining the Bluetooth addresses and other information of the cellular phone 1 and the PDA by the "inquiry", the Bluetooth control program 126G, in step S145, obtains from the association table a Bluetooth address associated with the strap ID obtained by way of an electromagnetic wave, and searches for an FHS packet transmitted from a slave based on the Bluetooth address. Then, the Bluetooth control program 126G identifies a slave having the Bluetooth address associated with the strap ID as a communicating party.

For example, assuming that the association table shown in FIG. 27 is stored, when a notification of a strap ID "A045PR63" is received from the contactless IC tag 3, the Bluetooth control program 126G searches for an FHS packet to identify a terminal having the Bluetooth address "08:00:46:21:14:F9". For example, if a Bluetooth address received in an FHS packet from the cellular phone 1 is "08:00:46:21:14:F9", the Bluetooth control program is allowed to identify the cellular phone 1 as a terminal of a communicating party.

Then, the Bluetooth control program 126G executes "paging" only for the cellular phone 1, identified as a communicating party in step S145. That is, subsequent processing is not executed with the Bluetooth control program of the PDA.

The subsequent processing is the same as the processing in steps S35 to S38 and steps S83 to S87, described with reference to FIGS. 23 and 24. That is, "paging" is executed between the Bluetooth control program 126G of the personal computer 11 and the Bluetooth control program 41B of the cellular phone 1, whereby synchronization is established.

Then, in step S150, the Bluetooth control program 126G of the personal computer 11 starts communication.

As described above, the personal computer 11 is also allowed to identify a communicating party based on a strap ID transmitted from the contactless IC tag 3 by registering the strap ID and the Bluetooth address in association with each other. That is, the user is allowed to start communication between the cellular phone 1 and the personal computer 11 only by placing the strap 2 in proximity to the personal computer 11.

Although information associated with a strap ID has been described as a Bluetooth device name or a Bluetooth address, various information that serves as unique identification information may be registered in association with a strap ID.

For example, if an IPv6 (Internet Protocol version 6) consisting of 128 bits is assigned to each apparatus, the personal computer 11, acting as a master, is allowed to obtain from an association table the address associated with a strap ID transmitted from the contactless IC tag 3, thereby identifying an apparatus for carrying out communication therewith.

A communication system in which a strap ID is obtained by communication between the contactless IC tag 3 and the reader/writer 12 and in which synchronization within a piconet is established based on a Bluetooth address or Bluetooth device name associated with the strap ID can be applied to communications between various apparatuses without limitation to communications between the cellular phone 1 and the personal computer 11.

For example, an information providing system similar to that described above can be implemented between a portable terminal such as a PDA with the contactless IC tag 3 attached thereto and a television receiver, a car navigation apparatus, an automatic vending machine, an ATM (automatic teller machine), etc.

Furthermore, without limitation to connections merely between apparatuses, by providing communication devices such as reader/writers, contactless IC tags, and Bluetooth modules in, for example, mobile bodies such as automobiles, trains, ships, and airplanes, and everywhere in buildings and towns, and by allowing connections to networks such as the Internet, LANs (local area networks), and WANs (wide area networks), via Bluetooth modules or the like, what is called a ubiquitous society (ubiquitous network society or ubiquitous computing society) can be realized.

In that case, a table of association between strap IDs and identification information of terminals may be stored on a predetermined server on a network so that any apparatus (reader/writer) that has received a strap ID is allowed to refer to the association table).

Although communication that is established has been described as based on Bluetooth, obviously, the present invention can be applied to communication methods other than Bluetooth, such as communications by wireless LANs (IEEE 802.11b).

Communications methods other than Bluetooth also include, for example, IEEE 802.11a, IEEE 802.11g, IrDA, HomeRF (SWAP), and Wireless 1394, and the present invention can also be applied to these communication methods.

As an alternative to the communication method of the contactless IC tag 3 described above, which uses a loop antenna for transmission of power and transfer of data, any communication method may be used as long as output is maintained small and a range of communication is set to be shorter than that of a communication method such as Bluetooth.

As an alternative to the memory stick 151 described above, the contactless IC tag 3 may be embedded in a card compliant with SD card (registered trademark) standard or CF card (registered trademark) standard. Furthermore, a seal may be used and attached to the cellular phone 1 instead of the strap shown in FIG. 1.

The series of processing steps described hereinabove may be executed either by hardware or by software.

If the series of processing steps are executed by software, a program that implements the software is installed on a computer embedded in special hardware, or installed, for example, on a general-purpose personal computer that allows execution of various functions with various programs installed thereon, via a network or from a recording medium.

The recording medium may be a package medium having recorded thereon the program, distributed for providing the program to a user separately from a main unit of apparatus, for example, a magnetic disk 141 (including a floppy disk), an optical disk 142 (including a CD-ROM (compact disk-read only memory) and a DVD (digital versatile disk)), a magneto-optical disk 143 (including an MD (registered trademark) (mini-disk)), or a semiconductor memory 144, as shown in FIG. 11. Alternatively, the recording medium may be the hard disk 153 having the program recorded thereon, which is embedded in a main unit of apparatus and provided to a user.

The steps of the program recorded on the recording medium need not necessarily be executed sequentially in the order described herein, and may be executed in parallel or individually.

The term system herein refers to the entirety of a plurality of apparatuses.

INDUSTRIAL APPLICABILITY

As described above, according to the present invention, a user is allowed to start communication readily and quickly.

The invention claimed is:

1. A communication system comprising:
an IC tag comprising:
  a first memory storing identification information of the IC tag; and
  an interface unit configured to send the identification information of the IC tag to an information processing apparatus, using a first communication function, when the IC tag is placed in close proximity with the information processing apparatus; and
the information processing apparatus comprising:
  a second memory configured to store, in a table, the identification information of the IC tag and a communication profile in association with the identification information, the communication profile indicating a method of data transmission;
  an obtaining unit configured to obtain the identification information from the IC tag using the first communication function;
  a communication unit configured to communicate with an external apparatus using a second communication function different from the first communication function; and
  a controller configured to:
    receive the identification information from the IC tag through the obtaining unit;
    obtain, from the table, the communication profile associated with the identification information; and
    establish a connection with the external apparatus through the communication unit using the obtained communication information.

2. The communication system according to claim 1, wherein the information processing apparatus further comprises an interface capable of turning on the first communication function of the obtaining unit.

3. The communication system according to claim 1, wherein:
the information processing apparatus further comprises a display, and
the controller is further configured to notify a user of receipt of the identification information by displaying a first message on the display.

4. The communication system according to claim 3, wherein the controller is further configured to notify the user to enter a parameter of the IC tag by displaying a second message on the display.

5. The communication system according to claim 4, wherein the controller is further configured to determine whether the user has entered the parameter.

6. The communication system according to claim 5, wherein the controller is further configured to register the parameter in association with the identification information in the table.

7. The communication system according to claim 6, wherein the controller is further configured to notify the user that the parameter has been registered by displaying a third message on the display.

8. The communication system according to the claim 1, wherein the first communication function is a near field communication function.

9. The communication system according to the claim 1, wherein the second communication function is a Bluetooth communication function.

10. The communication system according to the claim 1, wherein the IC tag is a seal.

11. The communication system according to the claim 1, wherein the IC tag is a memory card.

* * * * *